(12) United States Patent
Yeo et al.

(10) Patent No.: US 6,392,831 B1
(45) Date of Patent: May 21, 2002

(54) IDENTIFICATION OF DEFECTIVE SERVO INFORMATION ELEMENTS IN A DISC DRIVE SYSTEM

(75) Inventors: Ricky Wei Watt Yeo; Kian Keong Ooi; Wing Kong Chiang; Siok Yin Tan, all of Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/293,219

(22) Filed: Apr. 16, 1999

Related U.S. Application Data

(60) Provisional application No. 60/082,241, filed on Apr. 16, 1998.

(51) Int. Cl.[7] ................................ G11B 5/09
(52) U.S. Cl. ........................ 360/53; 360/77.08
(58) Field of Search .............. 360/53, 46, 49, 360/77.08, 31; 324/212, 226

(56) References Cited

U.S. PATENT DOCUMENTS

| | | | |
|---|---|---|---|
| 5,136,439 A | 8/1992 | Weispfenning et al. | |
| 5,262,907 A | 11/1993 | Duffy et al. | |
| 5,313,340 A | * 5/1994 | Takayama et al. | ............ 360/51 |
| 5,710,677 A | 1/1998 | Teng et al. | |

* cited by examiner

*Primary Examiner*—Alan T. Faber
(74) *Attorney, Agent, or Firm*—Richard J. Holzer, Jr.; Merchant & Gould P.C.

(57) ABSTRACT

A method and disc drive system identify defective servo information elements on a disc. Servo information elements are read from the track on the disc to receive first servo data status values associated with the servo information elements. If the first servo data status value associated with a first servo information element fails to satisfy a first predetermined criterion, the first servo information element is identified as a suspected servo information element. Location and error type information associated with the suspected servo information element is recorded in a hit table. The servo information elements from the track on the disc are reread with a second servo information element masked, and second servo data status values for the servo information elements are received. If the second servo data status value associated with the suspected servo information element satisfies the first predetermined criterion, the second servo information element is identified as the defective servo information element. A read head reads servo information elements from the track on the disc. A test module identifies suspected servo information elements. A hit table stores location and error type information associated with the suspected servo information elements.

19 Claims, 16 Drawing Sheets

IDENTIFICATION OF DEFECTIVE SERVO INFORMATION ELEMENTS IN A DISC DRIVE SYSTEM

The present application claims the benefit of U.S. Provisional Application No. 60/082,241 entitled DEFECTIVE SERVO WEDGE IDENTIFICATION AND ISOLATION ALGORITHMS USED IN AN EMBEDDED SERVO HARD DISC SYSTEM, filed Apr. 16, 1998.

FIELD OF THE INVENTION

The present invention relates generally to the field of disc drive systems, and more particularly to identifying defective servo information elements in disc drive systems.

BACKGROUND OF THE INVENTION

Modern disc drives typically comprise a stack of magnetic discs that are coated with a magnetizable medium and mounted on a hub of a spindle motor for rotation at a constant high speed. Data is stored on the discs in a plurality of concentric circular tracks extending approximately from the inner diameter ("ID") of each disc to the outer diameter ("OD") of each disc. An array of transducers ("heads") is typically mounted to flexures at the end of radial actuator arms that extend from an actuator body.

Typically, the heads in a disc drive write data to a selected data track on the disc surface by selectively magnetizing portions of the data track through the application of a time varying write current to the head. In order to subsequently read back the data stored on the data track, the head detects flux transitions in the magnetic fields of the data track and converts these to a signal that is decoded by read channel circuitry of the disc drive.

Control of the position of the heads is typically achieved with a closed loop servo system, such as disclosed in U.S. Pat. No. 5,262,907 entitled "Hard Disc Drive With Improved Servo System" issued to Duffy et al., assigned to the assignee of the present invention. In such a system, head position (servo) information is prerecorded on at least one surface of each disc. The servo system can be a "dedicated servo system" in which one entire disc surface is prerecorded with servo information elements and a corresponding dedicated servo head is used to provide essentially continuous servo position information to the servo system. Alternatively, an "embedded" servo system can be implemented in which servo information elements (e.g., servo wedges) are interleaved with user data and read by the same heads used to read and write the user data.

With either a dedicated or embedded servo system, it is common to generate a position error signal (PES), which is indicative of the position of the head with respect to the center of a particular track. Particularly, during track following, the servo system generates the PES from the servo information read from the disc and uses the PES to generate a correction signal. The correction signal is provided to a power amplifier to control the amount of current through the actuator coil in order to adjust the position of the head.

Typically, the PES is presented as a position dependent signal having a magnitude indicative of the relative distance between the head and the center of the track and a polarity indicative of the direction of the head with respect to the track center. Thus, it is common for the PES to have values ranging from, for example, minus 0.5 to plus 0.5 as the head sweeps across the track and to have a value of zero when the head is centered on the track. It will be recognized that the servo system generates the PES by comparing the relative signal strengths of precisely located magnetized servo burst fields in the servo information on the disc surface. The servo burst fields are generally arranged in an "offset checkerboard" pattern relative to a disc track. Through evaluation of the read signal magnitudes received by the servo system as the fields are read, the servo system determines and subsequently controls the relative position of the head to a particular track center. In digital servo systems, the PES is generated as a sequence of digital values over a selected range, with the digital value of any particular sample time indicative of the relative position of a head with respect to a selected track.

The continuing trend in the disc drive industry is to develop products with ever increasing arcal densities and decreasing access time. As this trend continues, greater demands are being placed on the ability of a modem servo system to control the position of data heads with respect to tracks. However, defective servo data in embedded servo hard disc systems, for example, can provide erroneous servo information to the servo system, increasing the possibility of read or write failure. For example, defective PES data could cause a read head to mis-track (e.g., the erroneous servo information can cause the read head to move off-track enough to overlap another track), thereby causing read errors. Even if the defective PES data in the first track does not individually exceed error tolerances, its contribution to the closed-loop system can cause correct PES data in another servo wedge to exceed the error tolerances.

Existing methods for identifying defective servo information elements include rewriting all servo information on a disc or track when a defect is found, and masking any track or servo servo information element that appears to exhibit a defect (i.e., fails to satisfy a predetermined criterion). However, the "rewrite" methods is time-consuming, and therefore, expensive, and the simple "masking" methods fail to consider the closed-loop characteristic of servo data, and therefore can mask a servo wedge that is merely a symptom of another (probably preceding) defective wedge. Accordingly, defective servo data in a first servo wedge may not fail to satisfy an error criterion for an individual servo wedge, but it may contribute to an apparent defect in a subsequent servo wedge in the track. Other existing "masking" methods attempt to recover a track appearing to have a PES defect by masking an alternate servo wedge in a track in the vicinity of the apparent PES defect wedge. Disadvantages of such methods include a failure to provide customized recovery steps in accordance with a specific detected error type, and the absence of partial recovery steps for defective servo information elements in accordance with error type.

SUMMARY OF THE INVENTION

The present invention provides a method and disc drive system for identifying defective servo information elements on a disc.

In accordance with a preferred embodiment, a method for identifying a defective servo information element in a track on a disc is provided including reading servo information elements from the track on the disc to receive first servo data status values associated with the servo information elements. If the first servo data status value associated with a first servo information element fails to satisfy a first predetermined criterion, the first servo information element is identified as a suspected servo information element. Location and error type information associated with the suspected servo information element is recorded. The servo information elements from the track on the disc are reread with a second servo information element masked, and second servo data status values for the servo information elements are received. If the second servo data status value associated with the suspected servo information element satisfies the first predetermined criterion, the second servo information element is identified as the defective servo information element.

In accordance with a preferred embodiment a disc drive system for identifying a defective servo information element In a track on a disc is provided including a read head that reads servo information elements from the track on the disc. If a first servo data status value associated with the first servo information element fails to satisfy a predetermined criterion, a test module identifies a first servo information element as a suspected servo information element. A storage module stores location and error type information associated with the suspected servo information element. A recovery module masks a second servo information element and rereads the servo information elements to receive second servo data status values for the servo information elements. If the second servo data status value associated with the suspected servo information element satisfies the predetermined criterion, the recovery module identifies the second servo information element as the defective servo information element.

In accordance with another embodiment, a disc drive system for identifying a defective servo information element in a track on a disc is provided including a read head that reads servo formation elements associated with servo data status values from the disc; and means for identifying the defective servo information element in accordance with the servo data status values.

These and various other features as well as advantages that characterize the present invention will be apparent from a reading of the following detailed description and a review of the associated drawings.

DETAILED DESCRIPTION

The embodiments of the invention described herein are implemented as logical steps in a disc drive system. The logical steps of the present invention are implemented (1) as a sequence of processor-implemented steps executing in a disc drive system and (2) as interconnected machine modules within the disc drive system. The implementation is a matter of choice, dependent on the performance requirements of the disc drive system implementing the invention. Accordingly, the logical steps making up the embodiments of the invention described herein are referred to variously as steps, steps, or modules.

Figure 1:
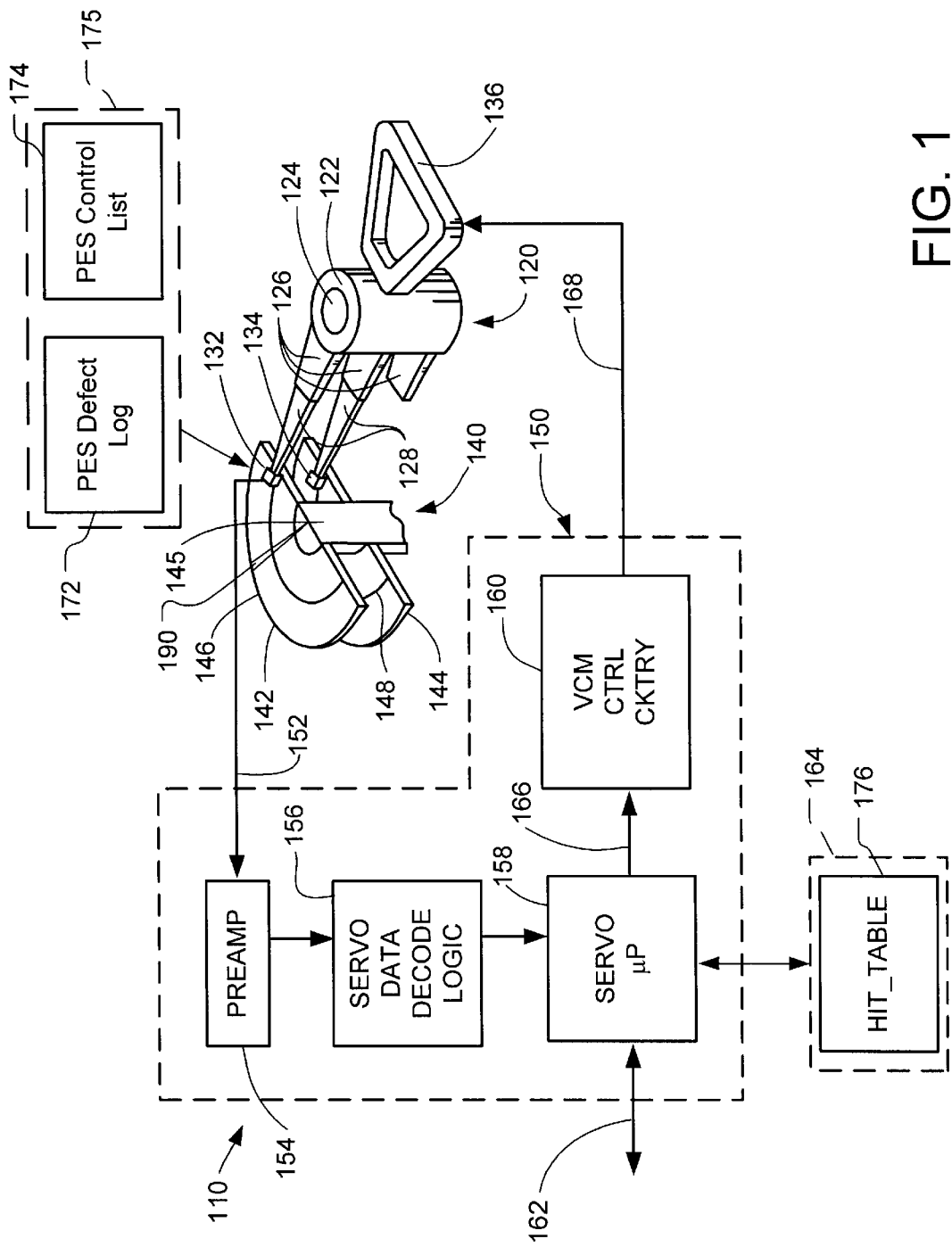
FIG. 1 depicts a functional block representation of a servo system for a disc drive in an exemplary embodiment of the present invention.

FIG. 1 depicts a functional block representation of a servo system for a disc drive (generally shown as 110) in an exemplary embodiment of the present invention. More particularly, FIG. 1 shows the disc drive 110 to include an actuator assembly 120, a disc assembly 140, and a servo loop 150, with the servo loop 150 operably controlling radial position of the actuator assembly 120 with respect to the disc assembly 140. The actuator assembly 120 comprises an actuator body 122 that pivots about a pivot shaft 124. The actuator body 122 includes arms 126 that extend radially as shown from the actuator body 122 and flexures 128 that extend from each of the arms 126. Mounted at the distal end of each of the flexures 128 is a head (as shown in FIG. 1 at 132 and 134). Additionally, an actuator coil 136 is mounted to the actuator body 122 opposite the arms 126. The coil 136 is part of a conventional voice coil motor (VCM) comprising the coil 136 and a pair of permanent magnets (not shown) located above and below the coil 136, so that the coil 136 moves through the magnetic field established by these magnets as the actuator body 122 pivots about the pivot shaft 124.

The disc assembly 140 comprises a plurality of discs (as shown in FIG. 1 as 142 and 144) mounted to a hub 145 for rotation at a constant high speed by a conventional spindle motor (not shown). The services of the discs 142 and 144 comprise a plurality of radially concentric tracks (as shown at 146 and 148).

It will be recognized that in a typical disc drive there will be one head per disc surface but for purposes of clarity, only two heads 132 and 134 have been shown in FIG. 1. These heads 132 and 134 correspond to the top surfaces of the discs 142 and 144. It will further be recognized that servo information will be prerecorded in servo information elements (e.g., servo wedge 190) on at least one of the surfaces of the discs 142 and 144 to provide the requisite servo positioning information to the servo loop 150. Alternatively, in a dedicated servo system, one disc is designated as a dedicated servo surface (such as the top surface of the disc 142) where servo information is prerecorded in servo information elements on all of the tracks and user data is stored on the remaining disc surfaces (such as on the surface of disc 144). In such a case, the head 132 would be a servo head and the head 134 would be a data head. In an embedded servo system, the servo information is intermittently prerecorded on all of the tracks, so that each of the tracks 146 and 148 contain both servo information and user information, and the heads 132 and 134 would operate as both servo and data heads. The present invention is not dependent upon the type of servo system implemented; however, for purposes of clarity, it is contemplated that at least one track 146 includes servo information that is read by the head 132 and provided to the servo loop 150.

The servo loop 150 receives the servo information from the head 132 on signal path 152, and this servo information is amplified by pre-amp circuit 154 and provided to servo data decode logic circuitry 156. The servo data decode logic circuitry 156 includes an analog to digital converter (ADC) so that selected digital representations of the servo information are provided to the servo microprocessor 158. The servo microprocessor 158 generates the aforementioned PES from the servo information and uses the PES to generate and output a correction signal to VCM control circuitry 160. The servo microprocessor 158 determines the correction signal in accordance with commands received by a disc drive system microprocessor (not shown) by way of signal path 162 and program instructions stored in servo RAM (Random Access Memory) 164. Preferably, the servo RAM 164 also stores program instructions for identifying defective servo information elements. The correction signal is provided by way of a signal path 166 to the VCM control circuitry 160, which includes a power amplifier (not shown) that outputs a controlled DC current of a selected magnitude and polarity to the coil 136 by way of a signal path 168 in response to the correction signal. Thus, during the track following mode, the servo information indicates the relative position error of the head 132 with respect to the center of the track 146 and the correction signal causes a correction in the DC (Direct Current) current applied to the coil 136 in order to compensate for this position error and move the head 132 to the center of the track 146. A detailed discussion of the construction and step of the servo loop 150 can be found in the Duffy et al. reference, U.S. Pat. No. 5,262,907, as well as U.S. Pat. No. 5,136,439 entitled "Servo Position Demodulation System" issued Aug. 4, 1992 to Welspfenning et al., assigned to the assignee of the present invention.

As will be recognized, the servo information is recorded during the manufacture of the disc drive 110 using a highly precise servo writer. The servo information serves to define the boundaries of each of the tracks and, in an embedded servo system, is divided circumferentially into a number of servo wedges (or servo information elements). Alternatively, in a dedicated servo system, the servo information elements are distributed on the dedicated servo disc. Each wedge comprises a plurality of fields, preferably including an AGC & SYNC ("Automatic Gain Control and Synchronization") field, an index field, a track ID ("identifier") field, and a position field. Of particular interest is the position field, but for purpose of clarity it will be recognized that the AGC & SYNC field provides input for the generation of timing signals used by the disc drive 110, the index field indicates radial position of the track and the track ID field provides the track address. Of course, additional fields may be used as desired in the format of the fields and the servo frame will depend upon the construction of the particular disc drive.

The position field comprises four position burst fields arranged in an offset quadrature pattern for a plurality of adjacent tracks. The position field comprises burst patterns A, B, C and D having selected geometries and magnetization vectors. As the head 132 sweeps from one track boundary to the next, the amplitudes of the A, B, C and D burst signals cycle between zero and maximum values. The servo microprocessor 158 of FIG. 1 relies on the amplitudes of the A, B, C and D burst signals to generate the PES, which is used to generate the correction signal for controlling the position of the head 132.

In an embodiment of the present invention, the PES is included in a four-byte servo data status value generated by the servo microprocessor 158. The first byte (the "error byte") reports on the status of the servo synchronization and track ID portion of a servo information element. Possible errors identified by the error byte include:

(1) Bad Gray Code—Indicates that one or more of the thirteen gray code dibits were read erroneously from the disc, resulting in a missing, extra, or partial gray code dibit and, therefore, an erroneous track ID;

(2) Missing Ones Bit—Indicates that one of the one bits inserted between every three gray code dibits is missing, suggesting an erroneous track ID;

(3) Missing or Extra Index—Indicates that an improper number of indexes were detected on the track (there should be only one); and (4) DC Erase Not Found—Indicates that the DC erase field used to synchronize the timing of the servo system is improperly detected (e.g., has spurious spikes).

Note that error types (1) and (2) are herein referred to as "Gray Code" errors and error types (3) and (4) are referred to as "Index/Erase" errors. Furthermore, additional error types may be generated by the servo system to identify defective servo information.

The second byte of the servo data status value (the "PES byte") provides the PES for the corresponding servo information element. An erroneous PES can be caused by, for example, one or more of the four servo bursts being written improperly, or being written on a media defect. If an erroneous PES is received by the servo control system, the transducer head will be improperly positioned over a track (and perhaps the wrong track altogether), resulting in read or write failure. The third and fourth bytes of the servo data status value (the "PWM" bytes), indicating a Pulse Width Modulated signal representing the amount of current required by the VCM to position the head transducer at the center to the track.

FIG. 1 also depicts a PES defect log ("PDL") 172, which is accessible by the servo microprocessor 158 and is used to keep track of servo tracks that are unusable and servo information elements (e.g., servo wedges) that are suspected of being defective or that have been identified as defective. The PDL preferably includes data fields for cylinder numbers, head numbers, servo wedge numbers, the number of errors detected during a Trigger Event (see step 206 of FIG. 2), the number of errors detected during a Verify Event (see step 208 of FIG. 2), the number of error detected during a Recovery Event (see step 214 of FIG. 2), the type of errors detected for the current servo wedge, the resulting status value used for specifying the servo masks, and the last PES value read. The types of errors preferably include a gray code error, a PES error, or both. A PES control list ("PCL") 174 stores user-defined thresholds and variables that are used to identify and isolate defective storage elements. The PDL 172 and the PCL 174 are shown as recorded in a region 175 of the disc 142. Other storage configurations and locations for the PDL 172 and the PCL 174 are also contemplated within the scope of the present invention, including storage in different regions of the disc or in non-volatile memory.

A HIT_TABLE 176 maintains descriptions of suspected servo information elements in RAM 164 or another storage medium. In an embodiment of the present invention, the HIT_TABLE contains data fields, including a servo wedge number, the number of errors detected during a Trigger Event (see step 206 of FIG. 2), the number of errors detected during a Verify Event (see step 208 of FIG. 2), the number of error detected during a Recovery Event (see step 214 of FIG. 2), the type of error detected, and the last PES value read. The cylinder number and the head number are maintained by the microprocessor, which is iterating through each cylinder and head combination.

Figure 2:
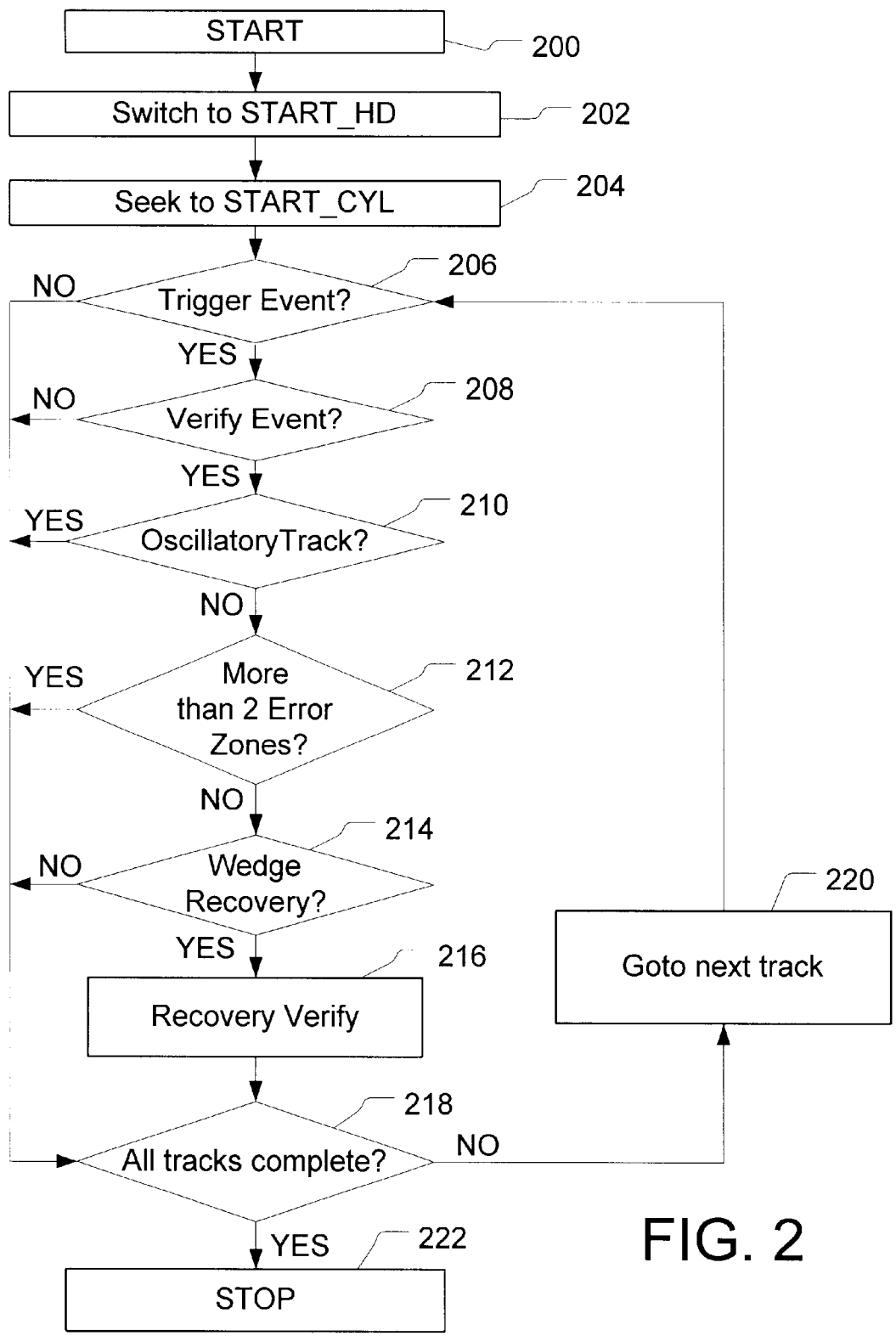
FIG. 2 depicts a flow chart of steps for identifying a defective servo information element in an exemplary embodiment of the present invention.

Masking generally refers to causing the servo system to ignore all or part of a servo information element as it guides the transducer head along a track on the disc surface. An entire track may also be masked, in that the servo information on the entire track is ignored and data is not read from or written on that track. In a preferred embodiment, mask descriptions are posted to the PDL recorded on a disc in the disc system. When the servo system receives the servo information from a servo information element posted in the PDL, the servo system ignores the defective portion of that data and, where appropriate, estimates (e.g., by extrapolating from the previous valid servo information element processed by the servo system) the servo information required to properly follow the track FIG. 2 depicts a flow chart of steps for identifying defective servo information elements in an exemplary embodiment of the present invention. Processing begins at START step 200. In step 202, processing starts at a head indicated by a START_HD parameter, preferably stored in the PCL 174 of FIG. 1. Other parameters discussed herein are also preferably stored in the PCL 174; however, other storage means and parameter input means are contemplated within the scope of the present invention. In step 204, the head identified as START_HD is moved to a cylinder identified by the START_CYL parameter.

Trigger Event step 206 is a first level evaluation of the servo elements on a track. If Trigger Event step 206 justifies additional recovery steps, suspected servo information elements recorded in the HIT_TABLE and processing proceeds to a Verify Event step 208, which preferably evaluates the servo information in the track using higher (more tolerant) error limits. If the Verify Event step 206 does not detect errors exceeding these threshold limits or otherwise disqualify the track as defective, step 218 directly proceeds to a next track in the disc drive through step 220 or to stop processing at step 222.

In the Verify Event step 208, the suspected servo information elements are reevaluated using different parameters, and then a Oscillatory Track Check step 210 is performed, if the track remains a candidate for recovery. Otherwise, processing proceeds to step 218. In the Oscillatory Track Check step 210, the track is evaluated to determine whether it is oscillatory. An oscillatory track is deemed unrecoverable and processing proceeds to step 218. Otherwise, Error Zone Search step 212 determines the number of error zones on the track. If there are more than two error zones on a track, processing proceeds to step 218. It should be noted that a threshold of two error zones is employed in a preferred embodiment of the present invention, but that a threshold of one or more error zones can be used without departing from the present invention. If the Error Zone Search does not find an excessive number of error zones, Recovery step 214 attempts recovery of the storage information elements in the track. If recovery is initially deemed successful, Recovery Verify step 216 verifies whether the recovery was successful. Otherwise, processing proceeds to step 218. The Recovery Verify step 216 performs a Sum of Absolute PES Span calculation (as discussed relative to FIG. 6). If the sum does not exceed the ABS_SUM_LIM parameter, the recovery of the track is considered verified. In Recovery Verify step 216, if recovery is successfully verified, a portion of the servo information on the track will remain usable. Alternatively, if the recovery is not verified, the entire track is deemed unrecoverable. In either case, processing proceeds to step 218.

Figure 3:
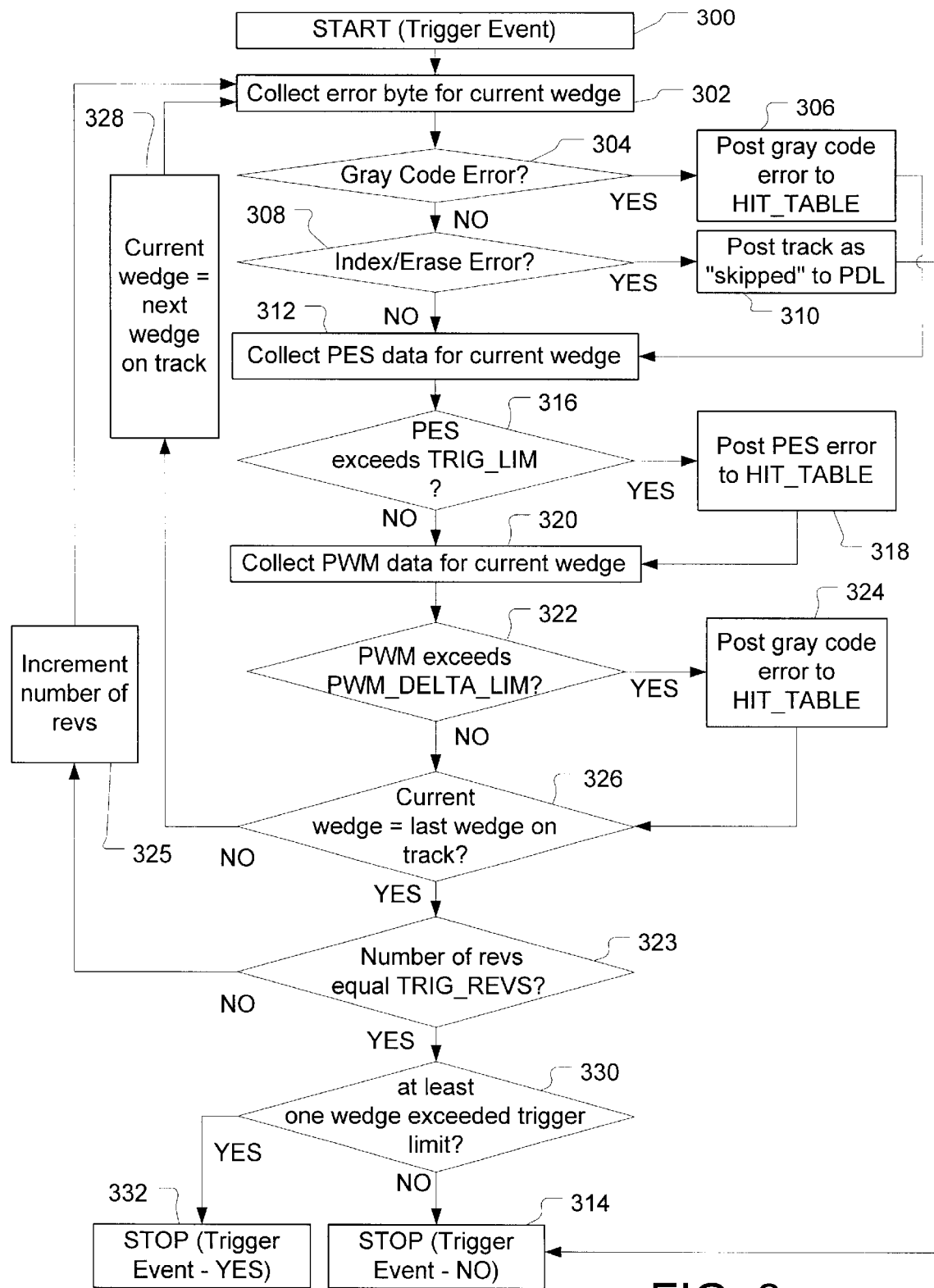
FIG. 3 depicts a flowchart of steps of a Trigger Event in an exemplary embodiment of the present invention.

FIG. 3 depicts a flowchart of steps of a Trigger Event step (see step 206 of FIG. 2) in an exemplary embodiment of the present invention. The Trigger Event step starts at step 300. Step 302 collects an error byte from the servo data status byte corresponding to the current wedge on the track of interest. Step 304 evaluates the error byte to determine whether a Gray Code error exists. If so, a Gray Code error code is posted to the error byte in a HIT_TABLE in step 306. In addition to posting a Gray Code error code, step 306 also posts the servo wedge number corresponding to the defective servo wedge, and increments the number of errors ("trigger hits") in the HIT_TABLE for the corresponding servo wedge. If a Gray Code error is not detected in step 304, step. 308 determines whether an index error or an erase error is detected in the current wedge. If so, step 310 posts a SKIP TRACK status to the PDL. Step 314 stops the Trigger Event step with a NO result. If step 308 does not indicate an index/erase error, processing proceeds to step 312.

In step 312, the PES data from the servo data status byte is collected for the current wedge. Step 316 determines whether the PES exceeds a trigger limit parameter, TRIG_LIM. If so, step 318 posts a PES error code to the error byte in the HIT_TABLE. In addition to posting a PES error code, step 318 also posts the servo wedge number corresponding to the defective servo wedge, and increments the number of trigger hits in the HIT_TABLE for the corresponding servo wedge, if not already incremented in step 306. If there is already a Gray Code error posted for the current wedge in the HIT_TABLE, the PES error code is merely added to the existing entry. Regardless of whether the PES data exceeds the TRIG_LIM parameter in step 316, step 320 collects PWM data from the servo data status byte of the current wedge. If the PWM data exceeds the PWM_DELTA LIM parameter in step 322, step 324 posts a Gray Code error to the error byte in the HIT_TABLE. In addition to posting a Gray Code error code, step 324 also posts the track number and the servo wedge number corresponding to the defective servo wedge, and increments the number of trigger hits in the HIT_TABLE for the corresponding servo wedge, if not already incremented in steps 306 or 318. If a Gray Code error or a PES error is already posted to the HIT_TABLE for the current wedge, another entry is not inserted for the wedge. Instead, the step 324 merely ensures that a Gray Code error is posted and then increments the hit count.

Step 326 determines whether the current wedge is the last unanalyzed wedge on the track. If not, step 328 indexes the current wedge to the next wedge on the track. Step 302 repeats the trigger event determination on the new current wedge. If the current wedge equals the last wedge on the track in step 326, step 323 repeats the processing, through step 325, if TRIG_REVS has not yet been met. Step 325 increments the number of revolutions (i.e., trigger revs), and the loop continues at step 302. If TRIG_REVS have been completed, step 330 determines whether at least one wedge on the track exceeded a trigger limit. If so, step 314 stops the Trigger Event step with a NO result. Otherwise, step 332 stops the Trigger Event step stops with a YES result.

Figure 4:
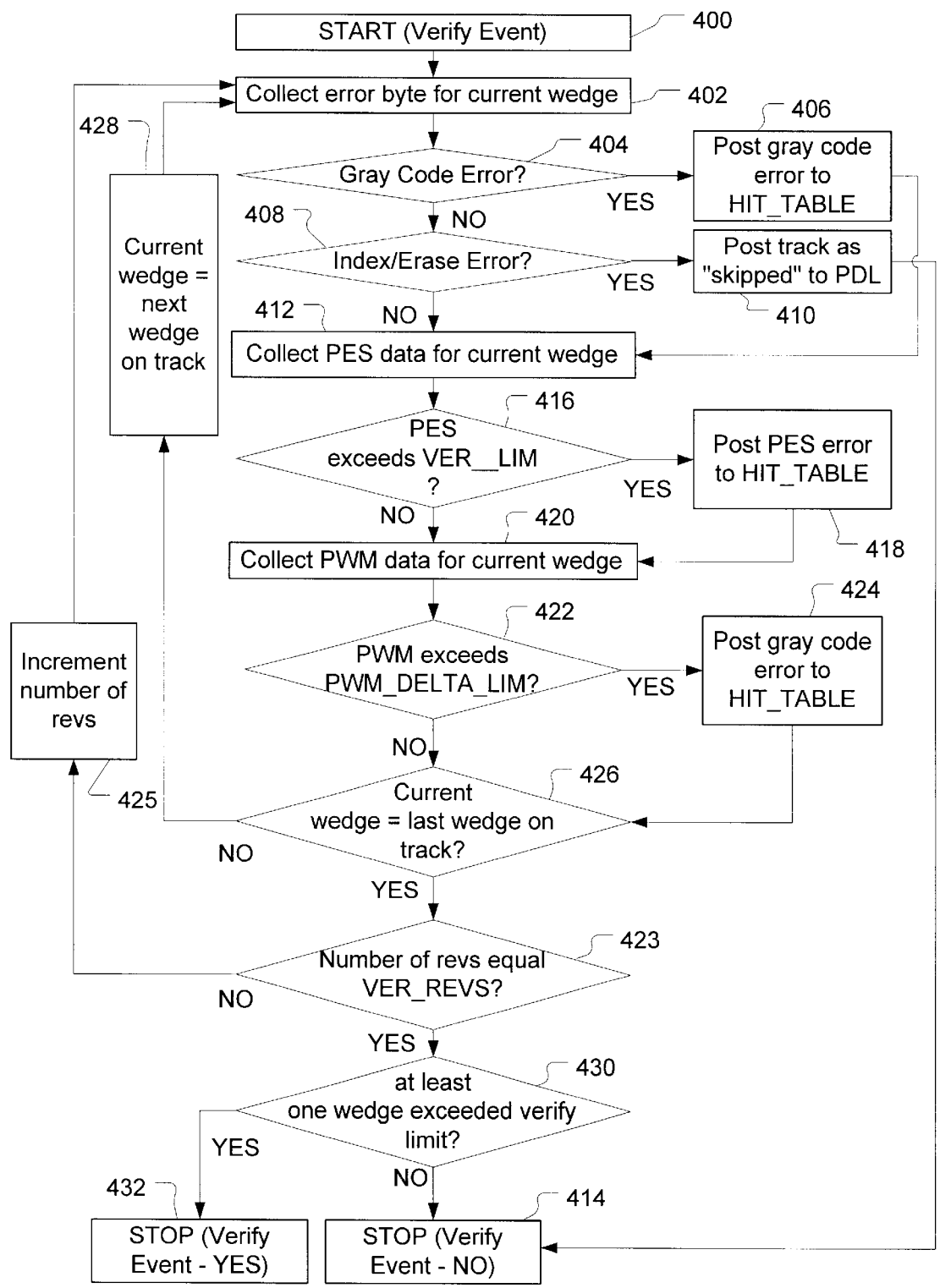
FIG. 4 depicts a flowchart of steps for the Verify Event in an exemplary embodiment of the present invention.

FIG. 4 depicts a flowchart of steps for the Verify Event determination (step 208 of FIG. 2) in an exemplary embodiment of the present invention. The Verify Event step starts at step 400. Step 402 collects an error byte from the servo data status byte corresponding to the current wedge on the track of interest. Step 404 evaluates the error byte to determine whether a Gray Code error exists. If so, a Gray Code error code is posted to the error byte of the HIT_TABLE in step 406. In addition to posting a Gray Code error code, step 406 also posts the servo wedge number corresponding to the defective servo wedge, and increments the number of errors ("verify hits") in the HIT_TABLE for the corresponding servo wedge. If a Gray Code error is not detected in step 404, step 408 determines whether an index error or an erase error is detected in the current wedge. If so, step 410 posts a SKIP TRACK status to the PDL. Step 414 stops the Trigger Event step with a NO result. If step 408 does not indicate an index/erase error, processing proceeds to step 412.

In step 412, the PES data from the servo data status byte is collected VER_REVS times for the current wedge. Step 416 determines whether the PES exceeds a VER_LIM parameter. If so, step 418 posts a PES error to the error byte in the HIT_TABLE and increments the verify hit count in the HIT_TABLE, if not already incremented in step 406. Step 420 collects PWM data from the servo data status byte for the current wedge. Regardless of whether the PES data exceeds the TRIG_LIM parameter in step 416, step 420 collects PWM data from the servo data status byte of the current wedge. If the PWM data exceeds the PWM_DELTA_LIM parameter in step 422, step 424 posts a Gray Code error to the error byte in the HIT_TABLE. In addition to posting a Gray Code error code, step 424 also posts the servo wedge number corresponding to the defective servo wedge, and increments the number of verify hits in the HIT_TABLE for the corresponding servo wedge, if not already incremented in step 406 or 418. If a Gray Code error or a PES error is already posted to the HIT_TABLE for the current wedge, another entry is not inserted for the wedge. Instead, the step 424 merely ensures that a Gray Code error is posted.

Step 426 determines whether the current wedge is the last unanalyzed wedge on the track. If not, step 428 indexes the current wedge to the next wedge on the track. Step 402 repeats the verify event determination on the new current wedge. If the current wedge equals the last wedge on the track in step 426, step 423 repeats the processing, through step 425, if VER_REVS has not yet been met. Step 425 increments the number of revolutions (i.e., verify revs), and the loop continues at step 402. If VER_REVS have been completed, step 430 determines whether at least one wedge on the track exceeded a verify limit, including preferably whether the number of PES hits in the HIT_TABLE exceeds the VER_HITS parameter. If so, step 414 stops the Verify Event step with a NO result. Otherwise, step 432 stops the Verify Event step stops with a YES result.

Figure 5:
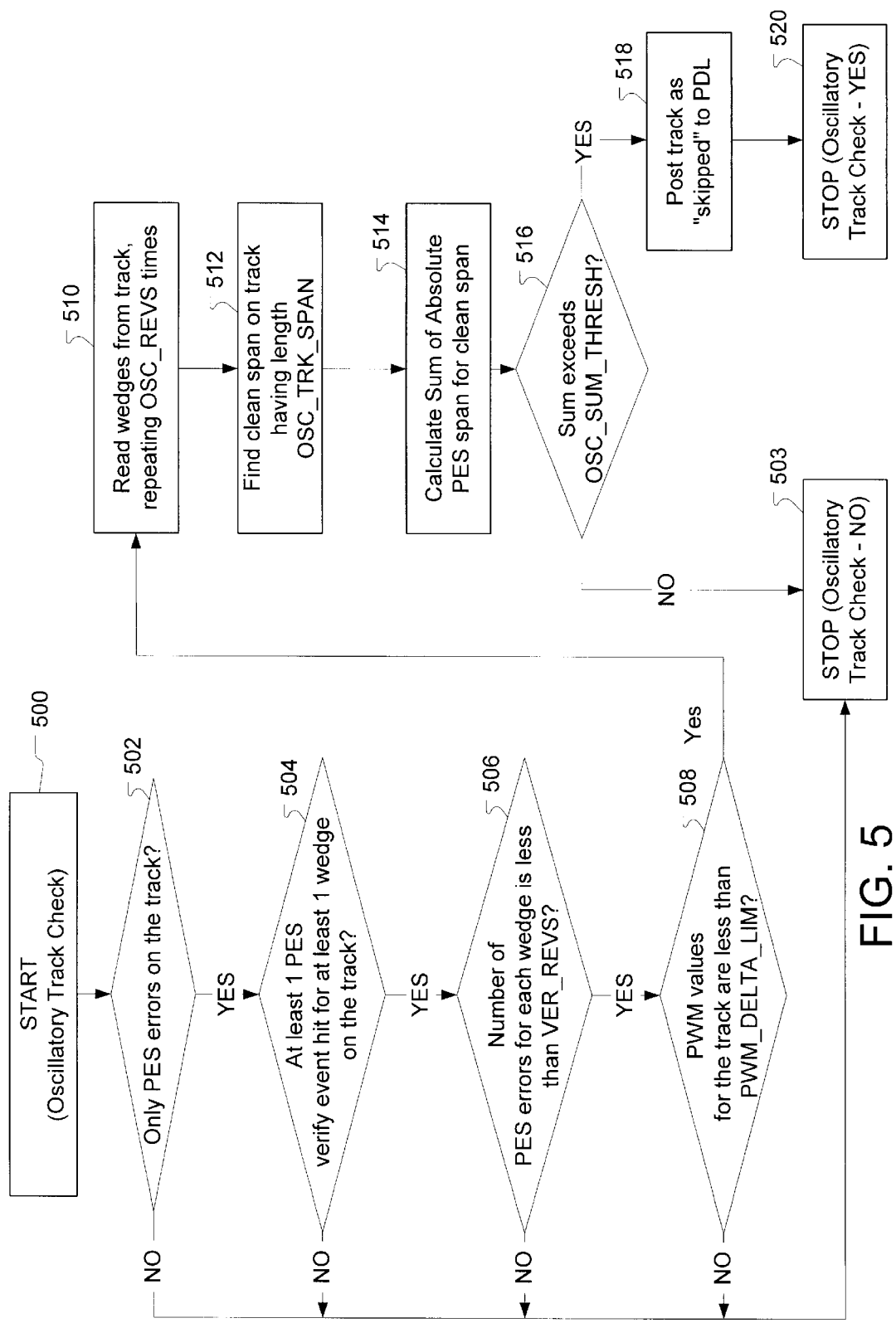
FIG. 5 depicts a flowchart of steps for an Oscillatory Track Check in an exemplary embodiment of the present invention.

FIG. 5 depicts a flowchart of steps for an Oscillatory Track Check (step 210 of FIG. 2) in an exemplary embodiment of the present invention. Generally, an oscillatory track is caused by the vibration of the servo writer as it is writing the servo track patterns. This oscillating action can result in track written with a sine wave pattern that will cause the servo system to oscillate as it attempts to follow the positioning information written on that track, typically resulting in read or write failure. Step 500 starts the oscillatory track check. Preferably, four preliminary conditions are evaluated before proceeding with the substantive portion of the oscillatory track check (i.e., starting with step 510). The first condition is tested in step 502, which determines if there are only PES errors on the track. If not, processing proceeds to STOP step 503 with a NO result. Otherwise, the condition at step 504 determines whether there is at least one PES verify event for at least one wedge on the track. If so, step 506 verifies that the number of PES errors for each wedge is less than VER_REVS. Step 508 determines whether the PWM values for the track are less than the PWM_DELTA_LIM. If so, processing proceeds to the substantive testing of step 510 through 516. Otherwise, the failure of any of these conditions directs processing to step 503 for termination of the oscillatory track check with a NO result.

In step 510, the servo information from all the wedges on the track are read OSC_REVS times. In step 512, a clean span on the track is located (i.e., an area on the track where there are no errors reported in the HIT_TABLE for a span of at least OSC_TRK_SPAN). In step 514, the sum of absolute PES span is calculated for the clean span. If the sum exceeds the OSC_SUM_THRESH in step 516, step 518 posts the track as skipped to the PDL. The Oscillatory Track Check stops with a YES result in step 520. If step 516 determines that the sum of absolute PES span does not exceed the OSC_SUM_THRESH parameter, the Oscillatory Track Check stops with a NO result in step 503.

Figure 6:
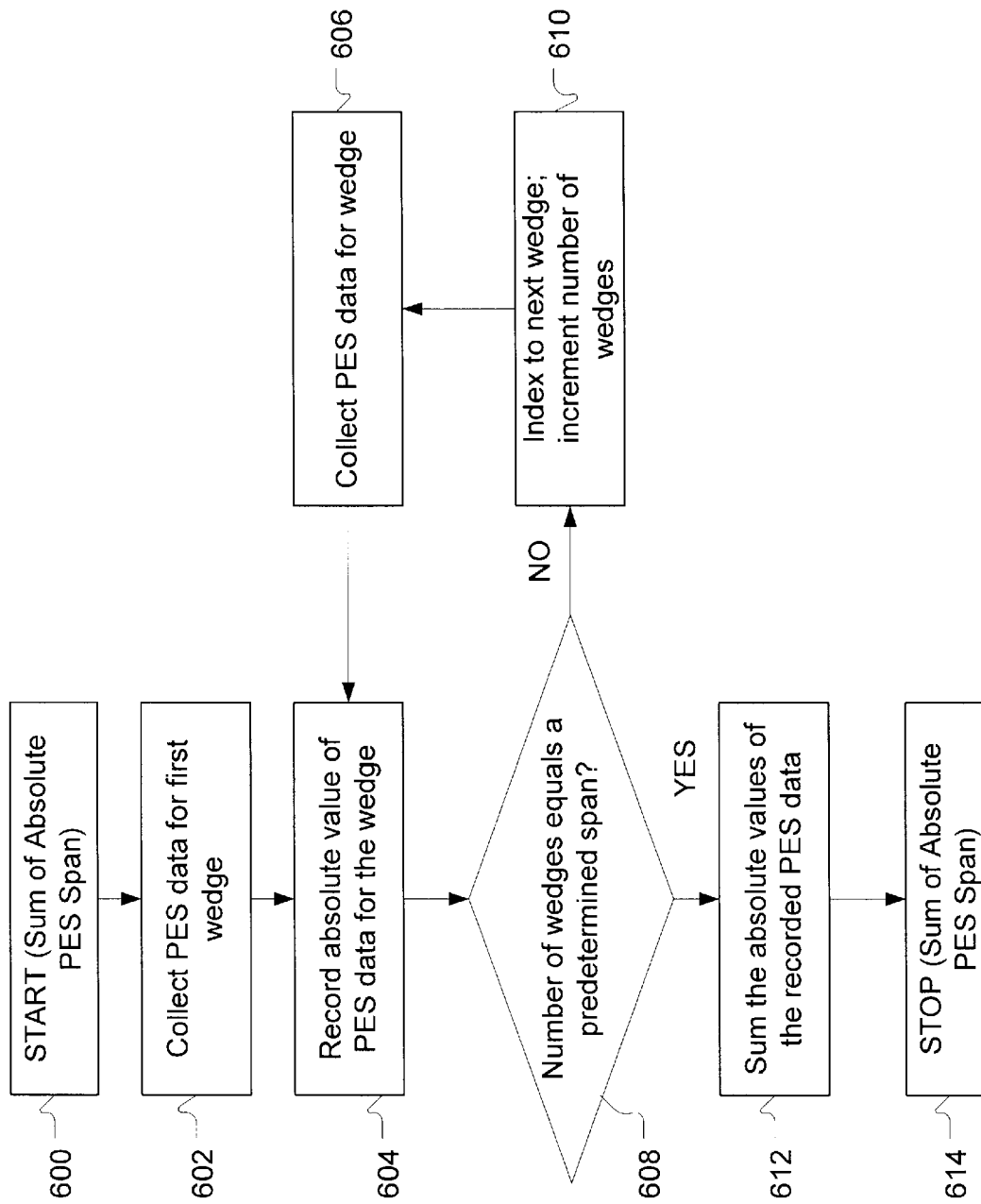
FIG. 6 depicts a flowchart of steps for performing a Sum of Absolute PES Span determination in an exemplary embodiment of the present invention.

FIG. 6 depicts a flowchart of steps for performing a sum of absolute PES span determination (step 515 in FIG. 5) in an exemplary embodiment of the present invention. Step 600 begins the determination steps. In step 602, PES data is collected for a first wedge. Step 604 records the absolute value of the collected PES data for the wedge. Step 608 determines whether the number of wedges evaluated equals a predetermined span parameter. If not, step 610 indexes to the next wedge and increments the number of wedges. In step 606, PES data is collected for the current wedge, and step 604 records the absolute value of the PES data for the current wedge. If the number of wedges is determined to equal the predetermined span parameter in step 608, step 612 sums the absolute values of the recorded PES data are summed. In the Oscillatory Track Check, the predetermined span parameter is the OSC_TRK_SPAN parameter. In the Recovery Event and the Recovery Verify Event, the predetermined span is defined relative to the defective servo wedge being evaluated. Step 614 stops the sum of absolute PES span determination.

Figure 7:
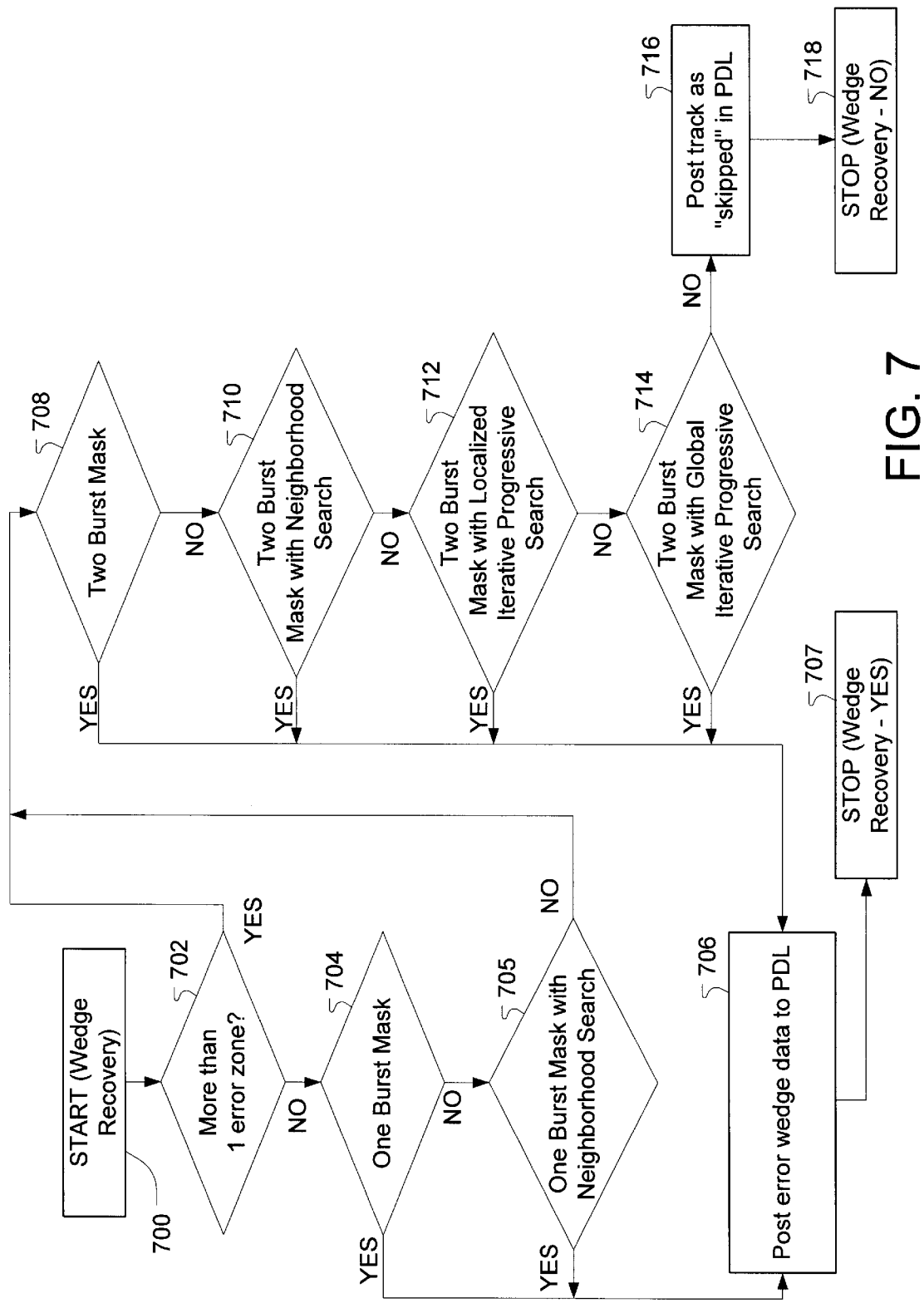
FIG. 7 depicts a flowchart of steps for recovering a suspected wedge in an exemplary embodiment of the present invention.

FIG. 7 depicts a flowchart of steps for recovering a defective wedge in an exemplary embodiment of the present invention (step 214 of FIG. 2). Step 700 starts the wedge Recovery step, which comprises preferably six conditional levels of recovery attempts. If one level does not successfully recover the servo information element, the next level is performed. Step 702 determines whether more than one error zone was detected in step 212 of FIG. 2. If so, processing skips the one burst mask searches of steps 704 and 705 and proceeds to the two burst mask of step 708. If only one error zone was detected, processing proceeds to step 704 in an attempt to recover the wedge using a single burst mask. If at least one steps 704, 705, 708, 710, 712, and 714 are successful, the resulting error wedge data (determined by a Determine Defect ID step—see FIG. 10) is posted to the PDL in step 706, and step 707 stops the Wedge Recovery step with a YES result. Otherwise, step 705 performs a single burst mask with a neighborhood search. If successful, processing proceeds to step 706. Otherwise, the two burst mask step 708 is performed.

The two burst mask step 708, the two burst mask with neighborhood search step 710, the two burst mask with localized iterative progressive search step 712 and the two burst mask with global iterative progressive search 714 are conditionally performed in succession. If any of the step 708 through 714 is successful in recovering the defective wedge, processing proceeds to step 706 where error wedge data is posted to the PDL. Otherwise, processing proceeds to the next masking level. If step 714 is unsuccessful in recovering a defective servo wedge, step 716 posts the track as "skipped" in the PDL. Step 718 stops the Wedge Recovery step with a NO result.

Figure 8:
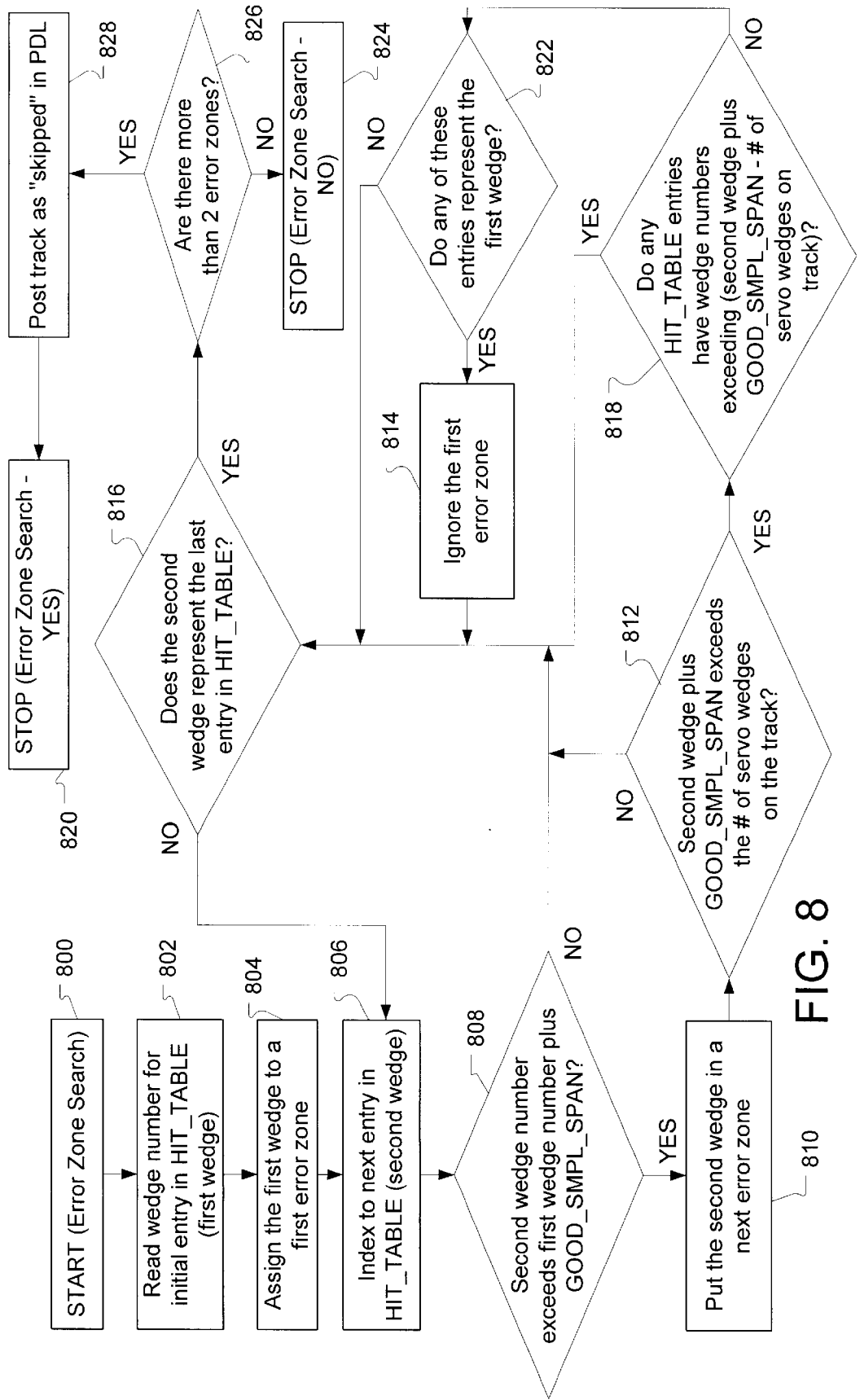
FIG. 8 depicts a flowchart of steps for determining the number of error zones on a track in an exemplary embodiment of the present invention.

FIG. 8 depicts a flowchart of steps for determining the number of error zones on a track (see step 212 in FIG. 2) in an exemplary embodiment of the present invention. The Error Zone Search step starts at step 800. Step 802 reads the wedge number for the initial entry in the HIT_TABLE. The wedge corresponding to this entry is designated as the "first wedge" in step 802. In step 804, the first wedge is assigned to a first error zone. Step 806 indexes to the next entry in the HIT_TABLE, which is designated the "second wedge", and reads the wedge number from that entry. Step 808 determines whether the second wedge number exceeds the first wedge number plus the GOOD_SMPL_SPAN parameter. If so, step 810 assigns the second wedge to a next error zone. Otherwise, step 816 determines whether the second wedge corresponds to the last entry in the HIT_TABLE. If not, processing proceeds to step 806. If the second wedge does correspond to the last entry in the HIT_TABLE, processing proceeds to step 826.

Steps 812, 814, 818, and 822 are related to detecting "washover" effects, in which the first wedge in the first error zone appears to be defected (i.e., suspected to be defective) only because of an apparent defect preceding it on the track. As such, these steps re-evaluate the first wedge to determine whether it is also included in the second error zone. If so, the first wedge is included in the second error zone and the first error zone is ignored (i.e., the subsequent recovery steps are performed in the second error zone only). Step 812 determines whether the wedge number for the second wedge, plus the GOOD_SMPL_SPAN exceeds the number of servo wedges in the track. If not, no "washover" effect is assumed, and processing proceeds to step 816. Otherwise, step 818 determines whether any HIT_TABLE entries have wedges numbers exceeding (the second wedge number plus the GOOD_SMPL_SPAN minus the number of servo wedges on the track. If so, processing proceeds to step 816. Otherwise, step 822 determines whether any of the HIT_TABLE entries identified in step 818 correspond to the initial wedge in the first error zone (i.e., the first wedge). If not, processing proceeds to step 816. Otherwise, the first error zone is ignored in step 814.

Step 826 determines whether more than two error zones exist. More than two error zones result in the track being posted as "skipped" in the PDL in step 828 and the Error Zone Search terminating with a YES result in step 820. Otherwise, step 823 stops the Error Zone Search step with a NO result.

Figure 9:
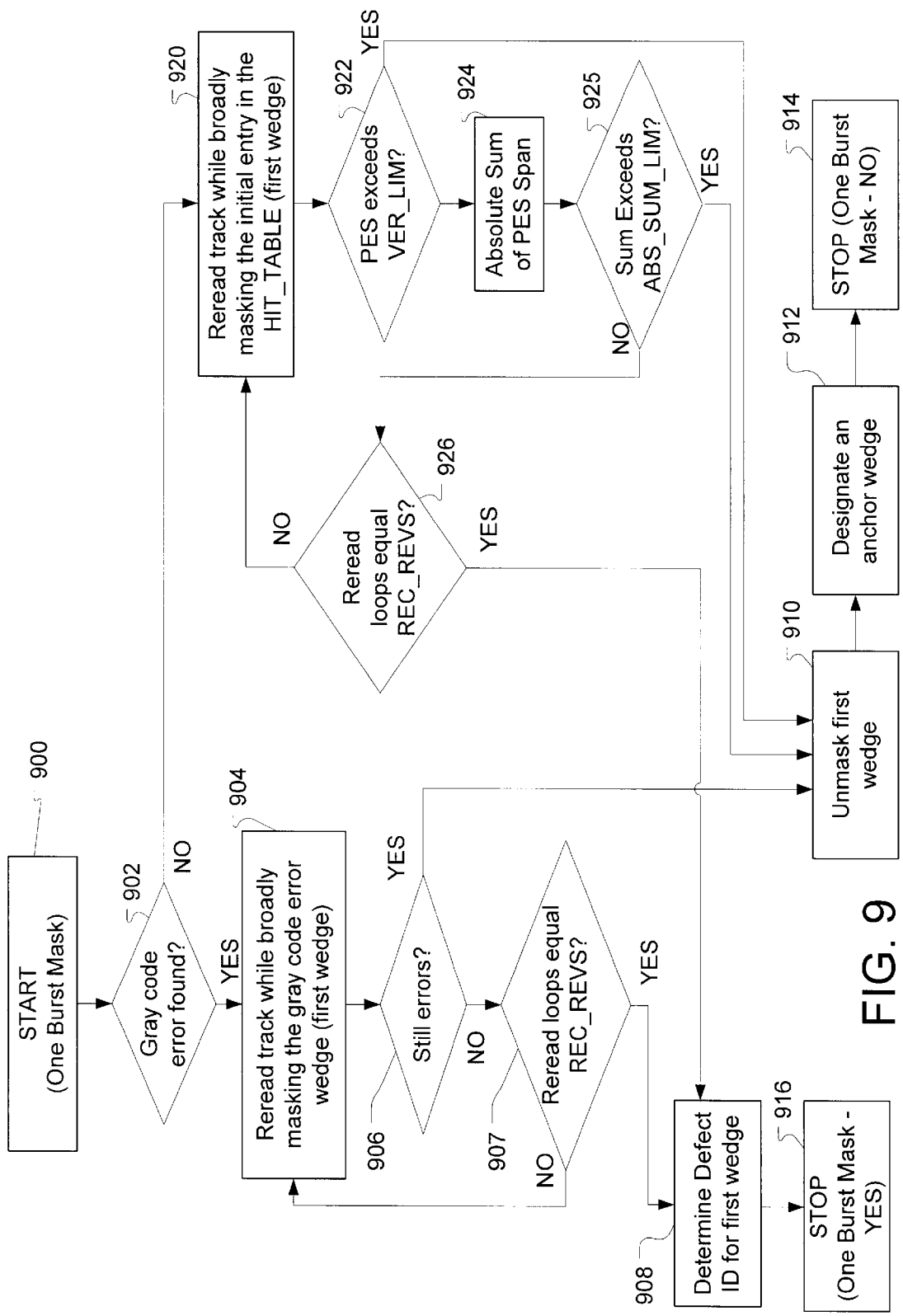
FIG. 9 depicts a flowchart of steps for performing a one burst mask in an exemplary embodiment of the present invention.

FIG. 9 depicts a flowchart of steps for performing a one burst mask (step 704 of FIG. 7) in an exemplary embodiment of the present invention. The first wedge to be masked is determined by the error type codes of the entries in the HIT_TABLE. The first entry that has a Gray Code error will be used as the "first wedge". If no Gray Code error codes exist in the HIT_TABLE, the first entry in the HIT_TABLE is used as the "first wedge". Step 902 evaluates the first wedge to determine whether a Gray Code error is found for that wedge. If step 902 identifies a Gray Code error, the track is reread in step 904 with the first wedge identified in step 902 broadly masked (i.e., both Gray Code and servo burst sections of the error wedge are ignored), and the PES bytes for the remaining wedges on the track are collected. If, after looping REC_REVS times via step 907, step 906 detects no additional errors for the whole track (i.e., with the first wedge to mask being broadly masked for both Gray Code and PES errors), the Determined Defect ID step 908 is performed to mask out certain portions of the servo wedge, and step 916 stops the one burst mask step stops with a YES result. Otherwise, if step 906 detects an error despite the broad mapping of step 904, processing proceeds to step 910. The first error wedge is unmasked in step 910 and one burst mask recovery of the first wedge is deemed to have failed. In step 912, the servo wedge number and error type code of the wedge that exhibited the error in step 906 as the "anchor wedge". Step 914 stops the one burst mask step with a NO result.

If step 902 does not detect a Gray Code error, a PES error is assumed. In step 920, the track is reread while the Gray Code and PES information of the first wedge is ignored. In addition, in step 920, REC_REVS rounds of PES bytes are collected. For each round, step 922 determines whether the collected PES values exceed VER_LIM. If so, processing processed to step 910. In step 924, the absolute sum of PES span is calculated. Step 925 determines whether the sum exceeds ABS_SUM_LIM. If so, processing also proceeds to step 910. Otherwise, step 926 determines whether the reread loops have reached or exceeded REC_REVS. If not, the looping continues. Otherwise, processing proceeds to step 908 to mask determine the defect ID. If recovery fails in the one burst mask step, step 928 unmasks the error wedge.

Figure 10:
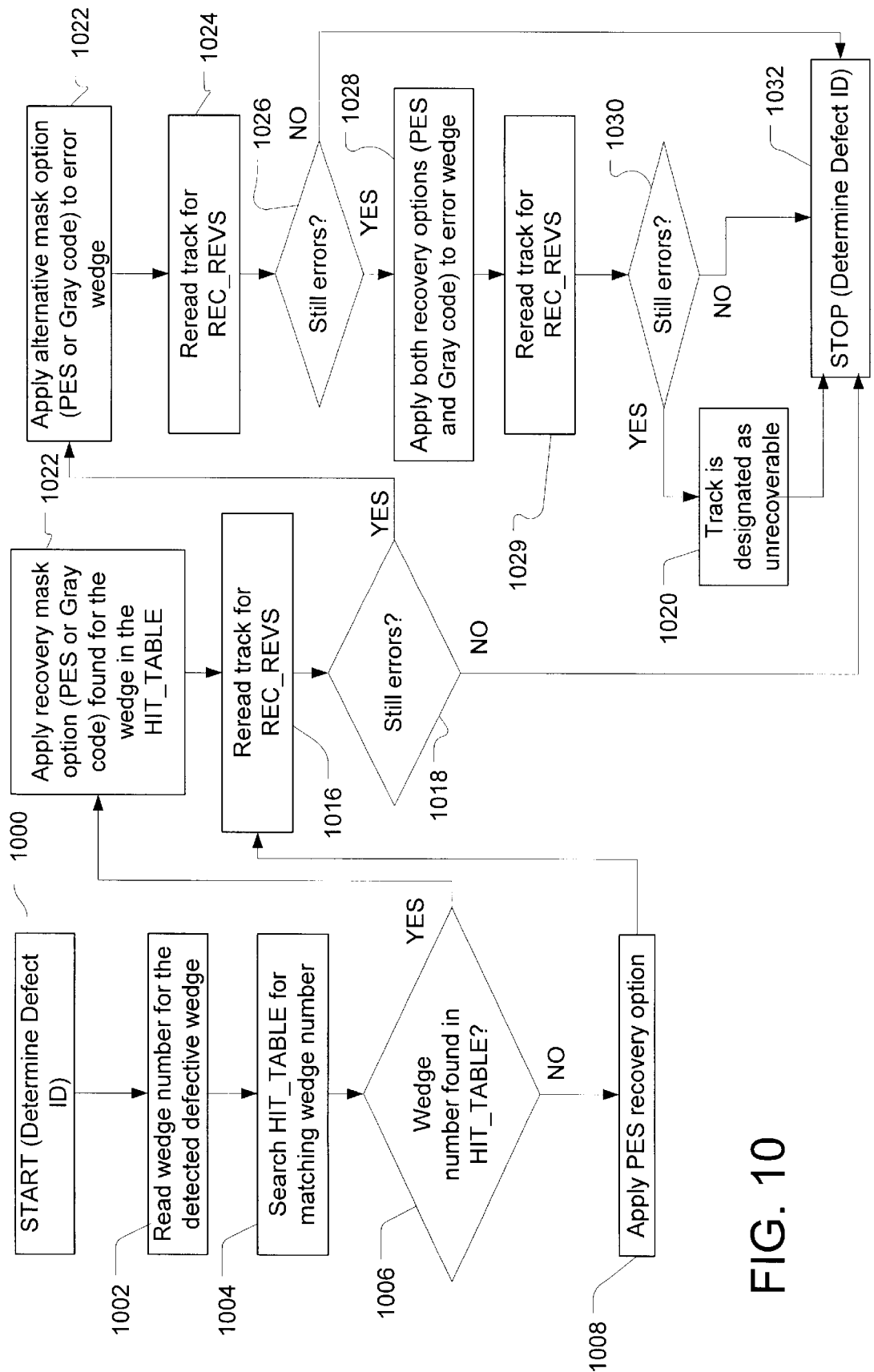
FIG. 10 depicts a flowchart of steps for determining the defect ID ("identifier") for a defective portion of a recovered servo information element.

FIG. 10 depicts a flowchart of steps for determining the defect ID for a defective portion of a recovered servo storage element (see step 908 of FIG. 9). Some defects can cause only certain portions of the affected servo wedge to be unusable. The rest of the servo information in that wedge can still be utilized if undamaged. The Determine Defect ID step attempts to isolate only the defective portions of the defective wedge with the intent of increasing yield. For example, the gray code portion of the servo wedge can be masked, the servo positioning portion (i.e., corresponding to the servo bursts) of the servo wedge can be masked, or both can be masked. Step 1000 starts the step of determining the defect ID. Step 1002 reads the wedge number for the defective wedge detected by the search level that initiated this sub-process. Step 1004 searches the HIT_TABLE for a matching wedge number. If the wedge number is found in step 1006, step 1014 applies the recovery option in the error byte (e.g., Gray Code masking or PES masking) in the HIT_TABLE.

Step 1016 rereads the track repeatedly REC_REVS times. Step 1018 determines whether errors are still detected during the REC_REVS loops, using the verify limits and step used in Verify Event. To simplify FIG. 10 and all subsequent figures, steps such as step 1016 and step 1018 are illustrated as sequential. Such an implementation is functional, however, it is preferred that the processing is directed to step 1022 as soon as an error is detected during the reread loops of step 1016, instead of waiting until all REC_REVS loops are completed. If additional errors are not detected in step 1018, step 1032 stops the Determine Defect ID step. Otherwise, step 1020 applies the alternative option to the error wedge. For example, if a Gray Code option was applied in step 1014, a PES option (the alternative option) is applied in step 1020. Step 1024 rereads the track REC_REVS times. Step 1026 determines whether additional errors exist. If so, step 1028 applies both recovery options (i.e., that is PES and Gray Code options) to the error wedge, and step 1029 rereads the track REC_REVS times. Otherwise, if no errors are detected, processing proceeds to step 1032. If step 1030 detects additional errors, step 1022 designates the track as unrecoverable.

If no wedge number in HIT_TABLE is found to match the wedge number of the detected defective wedge in step 1006, step 1008 applies the PES recovery option by default, and processing proceeds to step 1016.

Figure 11:
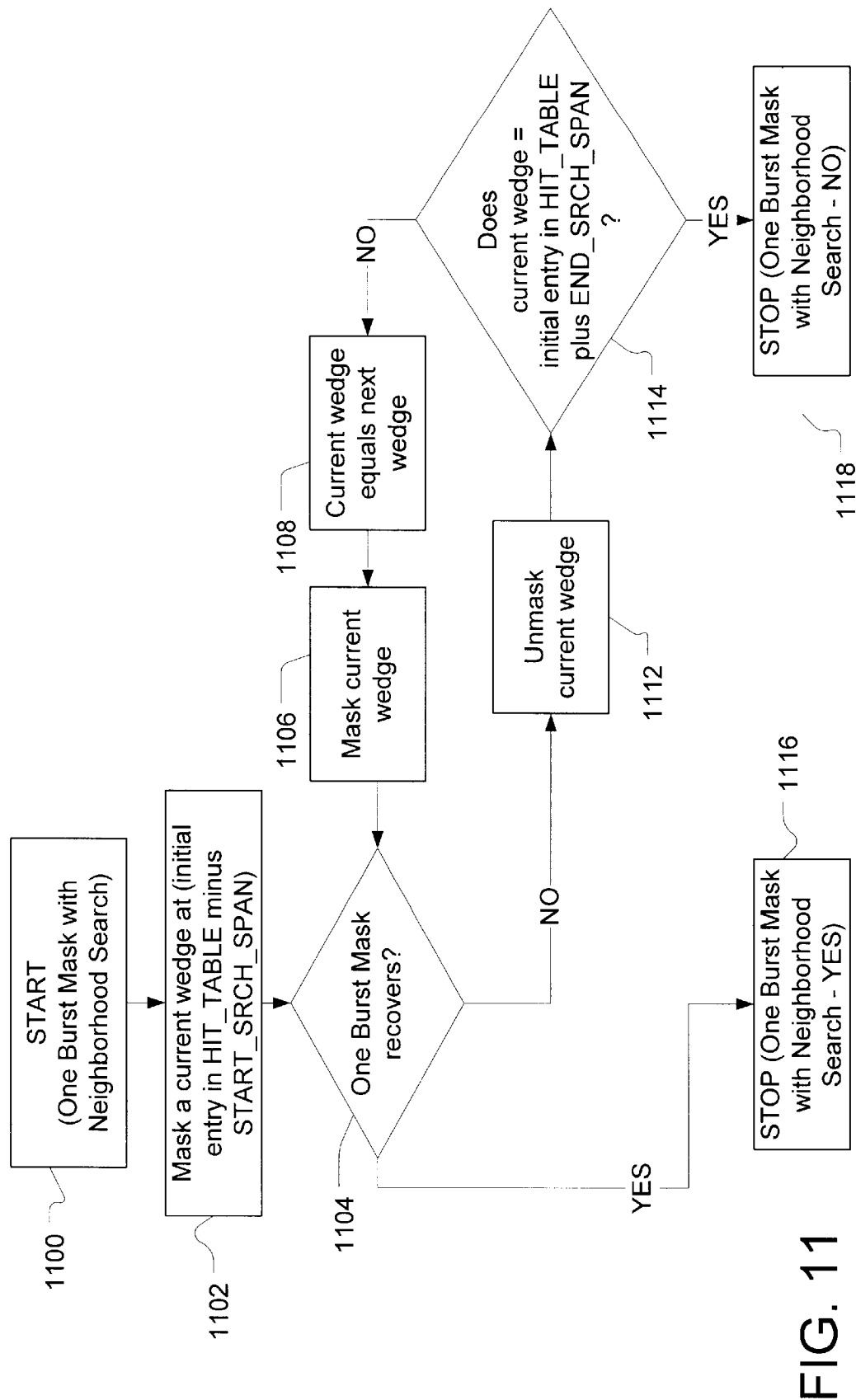
FIG. 11 depicts a flowchart of steps for performing a one burst mask with a neighborhood search in an exemplary embodiment of the present invention.

FIG. 11 depicts a flowchart of steps for performing a one burst mask with a neighborhood search (step 705 of FIG. 5) in an exemplary embodiment of the present invention. The search starts at step 1100. Step 1102 masks a current wedge that is identified relative to the wedge corresponding to the initial entry in the HIT_TABLE. That is, the current wedge equals the initial entry in the HIT_TABLE minus START_SRCH_SPAN. In step 1104, the track is retested using the one burst mask steps of FIG. 9, which determines whether additional errors exist. If no additional errors exist (i.e., the track is recovered), step 1116 stops the one burst mask with a neighborhood search with a YES result. If additional errors are detected in step 1104, step 1112 unmasks the current wedge. Step 1114 determines whether the current wedge represents the end of the neighborhood search span. That is, if the current wedge equals the initial entry in the HIT_TABLE plus the END_SRCH_SPAN parameter, step 1118 stops the one burst mask with neighborhood search with a NO result. Otherwise, step 1108 indexes the current wedge to the next wedge in the track. In step 1106, the new current wedge is masked and processing proceeds to step 1104.

Figure 12:
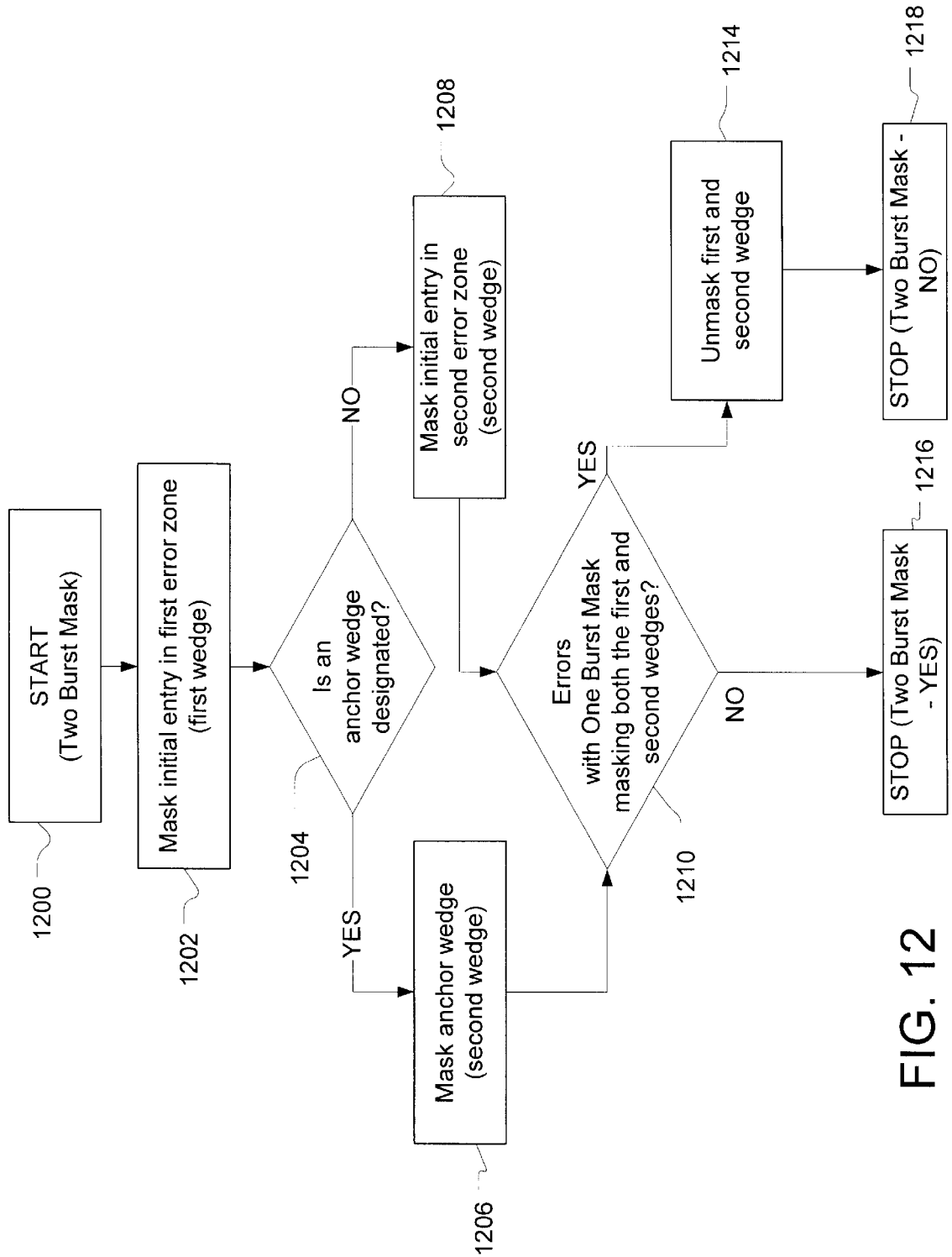
FIG. 12 depicts a flowchart of steps for performing a two burst mask in an exemplary embodiment of the present invention.

FIG. 12 depicts a flowchart of steps for performing a two burst mask (step 708 of FIG. 7) in an exemplary embodiment of the present invention. The masking step starts in step 1200. Step 1202 masks the wedge corresponding to the first HIT_TABLE entry (first wedge) in the first error zone. Step 1204 determines whether an anchor wedge has been recorded, which would be an indication of a single error zone. If no anchor wedge is designated, step 1208 masks the wedge corresponding to the first HIT_TABLE (second wedge) in the second error zone. Otherwise, step 1206 masks the anchor wedge (second wedge). Step 1210 retests the track in a manner similar to the one burst mask with both the first and second wedges broadly masked. That is, the one burst mask is performed, but instead of masking only the first wedge, both the first and the second wedges are masked. If additional errors are detected in step 1210, the first and second wedges are unmasked in step 1214 and the two burst mask step stops in step 1218 with a NO result. Otherwise, step 1216 stops the two burst mask step with a YES result.

Figure 13:
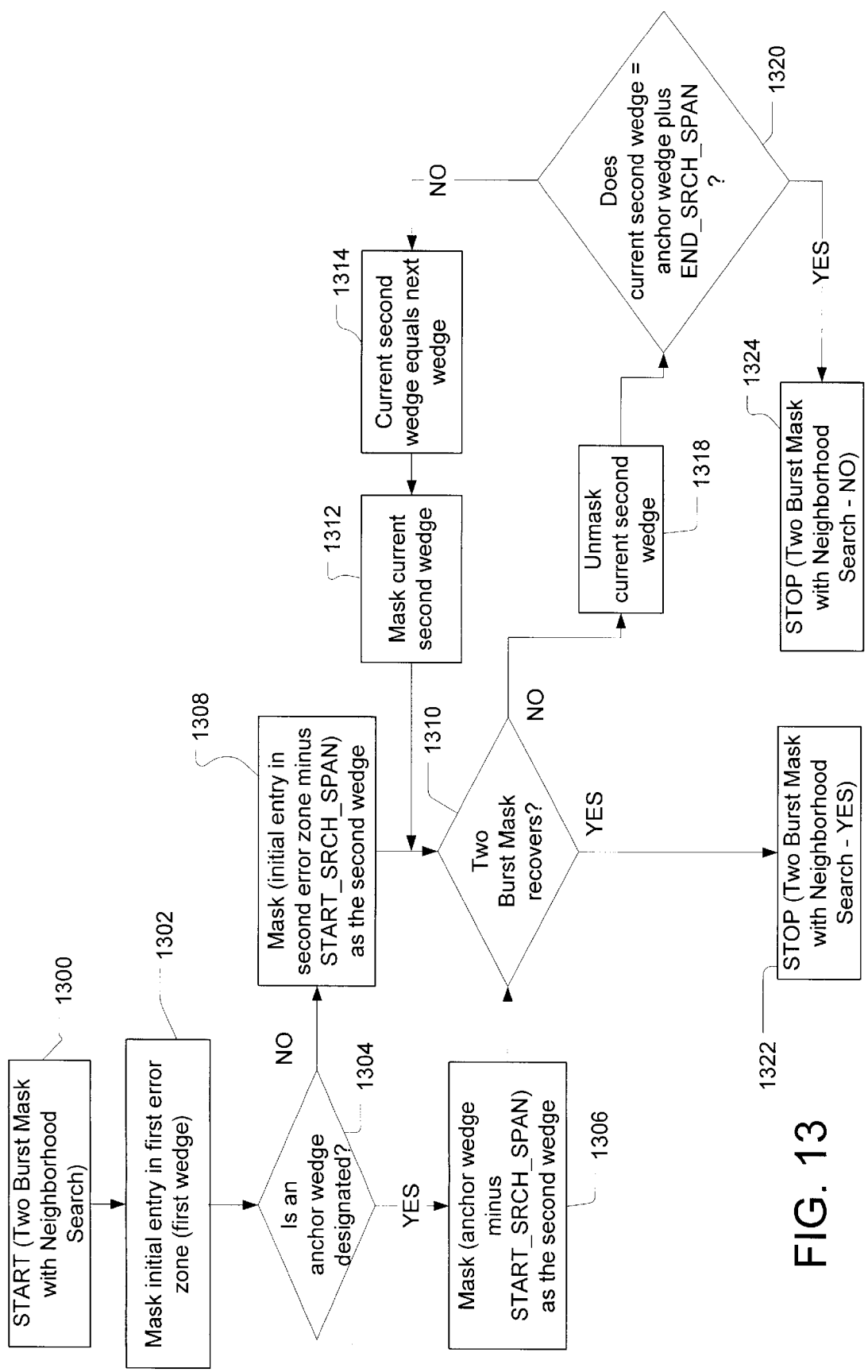
FIG. 13 depicts a flowchart of steps for performing a two burst mask with a neighborhood search in an exemplary embodiment of the present invention.

FIG. 13 depicts a flowchart of steps for performing a two burst mask with a neighborhood search (step 710 of FIG. 7) in an exemplary embodiment of the present invention. The masking step starts in step 1300. Step 1302 masks the wedge corresponding to the first HIT_TABLE entry (first wedge) in the first error zone. Step 1304 determines whether an anchor wedge has been recorded, which would be an indication of a single error zone. If no anchor wedge is designated, step 1308 masks the wedge corresponding to the first HIT_TABLE entry (second wedge) in the second error zone. Otherwise, step 1306 masks a second wedge that is identified relative to the anchor wedge. That is, the second wedge equals the anchor wedge minus the START_SRCH_SPAN parameter. Step 1310 retests the track using the two burst mask, with the first and second wedges broadly masked. If no additional errors are detected in step 1310 (i.e., the track is recovered), step 1322 stops the two burst mask step with a YES result. If step 1310 detects additional errors, the current second wedge is unmasked in step 1318. Step 1320 determines whether the current second wedge equals the anchor wedge plus the END_SRCH_SPAN parameter. If so, the two burst mask with neighborhood search stops with a NO result in step 1324. The first wedge is also unmasked. Otherwise, the current second wedge is indexed to the next wedge in the HIT_TABLE in step 1314 and is masked in step 1312. Step 1310 then rereads the track and the loop continues.

Figure 14:
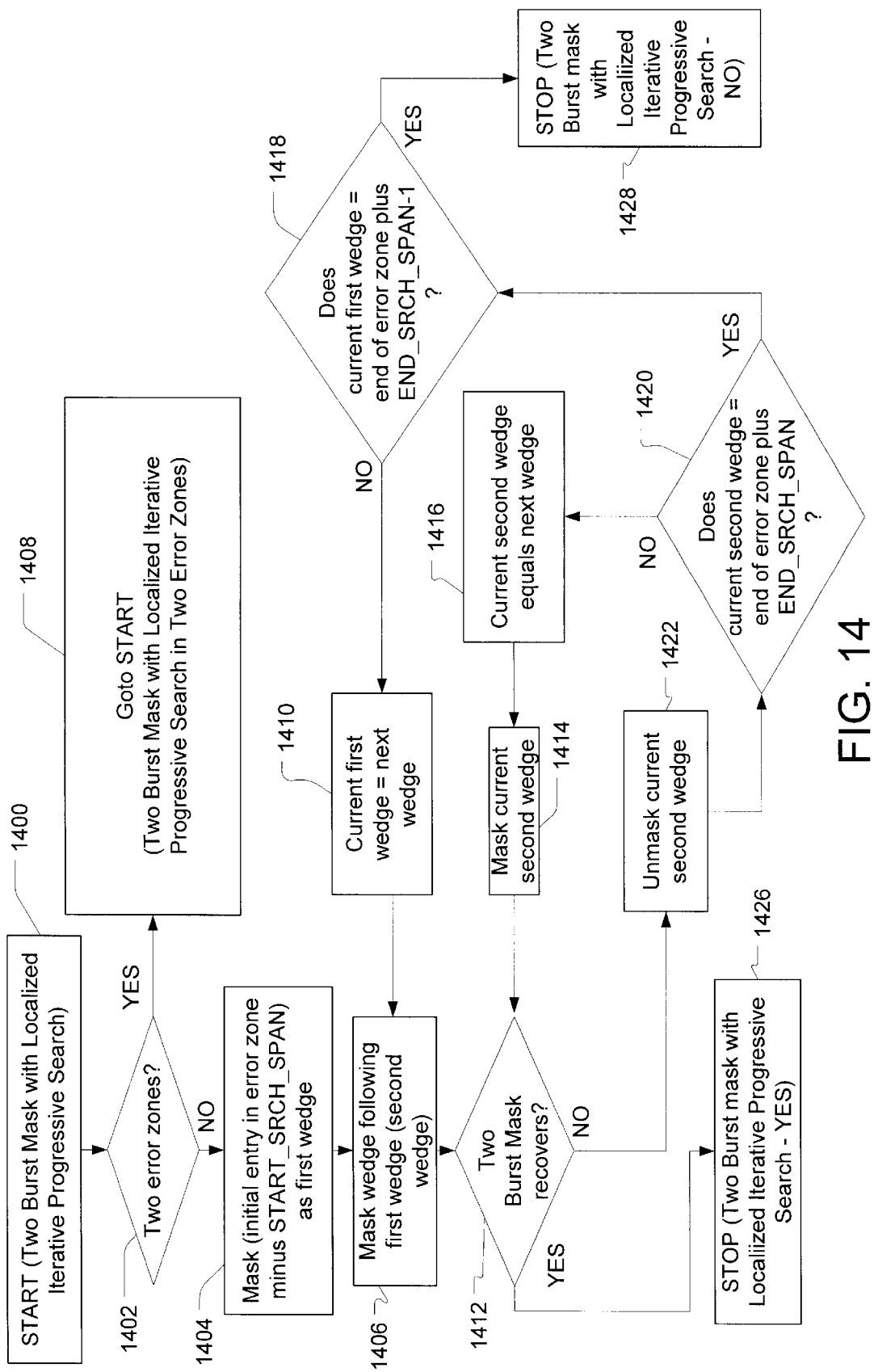
FIG. 14 depicts a flowchart of steps for performing a two burst mask with a localized iterative progressive search in an exemplary embodiment of the present invention.

FIG. 14 depicts a flowchart of steps for performing a two burst mask with a localized iterative progressive search (step 712 of FIG. 7) in an exemplary embodiment of the present invention. The masking step starts in step 1400. Step 1402 directs processing to step 1408 (see FIG. 15) if there are two error zones for the present track. Otherwise, step 1404 masks a first wedge at the start of the error zone minus the START_SRCH_SPAN parameter. Step 1406 masks the next wedge (after the first wedge) in the HIT_TABLE as the second wedge. Step 1412 retests the track using the two burst mask, with the first and second wedges broadly masked. If no additional errors are detected (i.e., the track is recovered), the two burst mask with a localized iterative progressive search stops in step 1426 with a YES result.

If step 1412 detects additional errors, step 1422 unmasks the current second wedge. If the current second wedge is determined to be the last wedge in the search span in step 1420, step 1418 determines whether the first wedge is the last wedge in the search span. If so, step 1428 stops the masking step with a NO result. The first wedge is also unmasked. Otherwise, if the second wedge is not the last wedge in the search span, the current second wedge is indexed to the next wedge in the HIT_TABLE in step 1416 and is masked in step 1414. If the second wedge is the last wedge in the search span but the first wedge is not, then step 1410 unmasks the first wedge and indexes the first wedge to equal the next wedge in the HIT_TABLE. Step 1410 also masks the new first wedge. The effect of this search is to iteratively mask two servo wedges in a limited span of a single error zone until the track is recovered.

Figure 15:
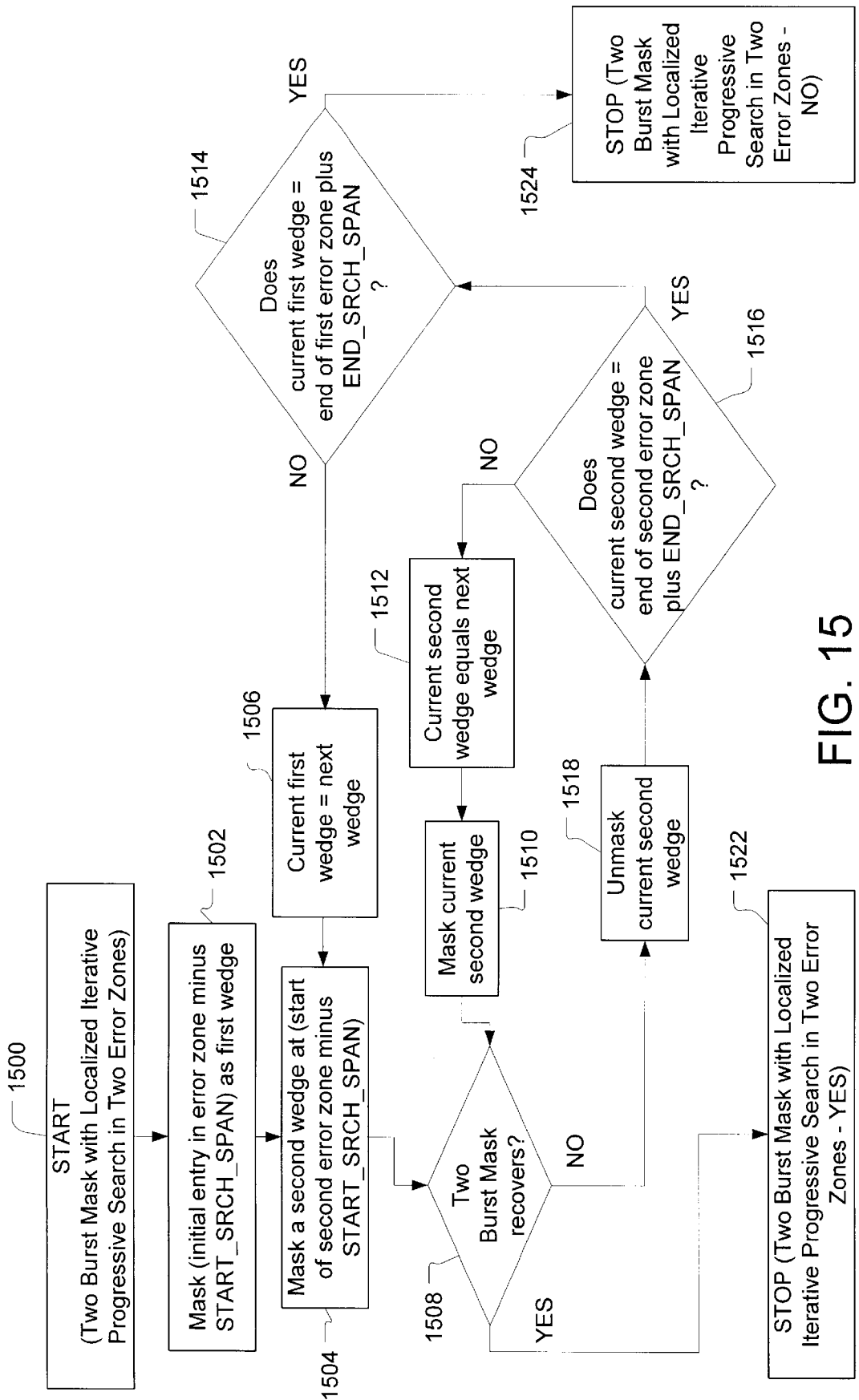
FIG. 15 depicts a flowchart of steps for a two burst mask with localized iterative progressive search in two error zones in an exemplary embodiment of the present invention.

FIG. 15 depicts a flowchart of steps for a two burst mask with localized iterative progressive search in two error zones (see step 712 of FIG. 7) in an exemplary embodiment of the present invention. The masking step starts in step 1500. Step 1502 masks a first wedge at the start of the first error zone minus the START_SRCH_SPAN parameter. Step 1504 masks a second wedge at the start of the second error zone minus the START_SRCH_SPAN parameter. Step 1508 retests the track using the two burst mask with the first and second wedges broadly masked. If no additional errors are detected (i.e., the track is recovered), the two burst mask with a localized iterative progressive search in two error zones stops in step 1522 with a YES result.

If step 1508 detects additional errors, step 1518 unmasks the current second wedge. If the current second wedge is determined to be the last wedge in its search span in step

1516, step 1514 determines whether the first wedge is the last wedge in its search span. If so, step 1524 stops the masking step with a NO result. The first wedge is also unmasked in step 1524. If the second wedge is not determined in step 1516 to be the last wedge in the search span, the current second wedge is indexed to the next wedge in the HIT_TABLE in step 1512 and the current second wedge is masked in step 1510. If the second wedge is the last wedge in its search span but the first wedge is not the last wedge in its search span, then step 1506 unmasks the first wedge and indexes the first wedge to equal the next wedge in the HIT_TABLE. Step 1506 also masks the new first wedge. The effect of this search is to iteratively mask two servo wedges in a limited span relative to two error zones.

Figure 16:
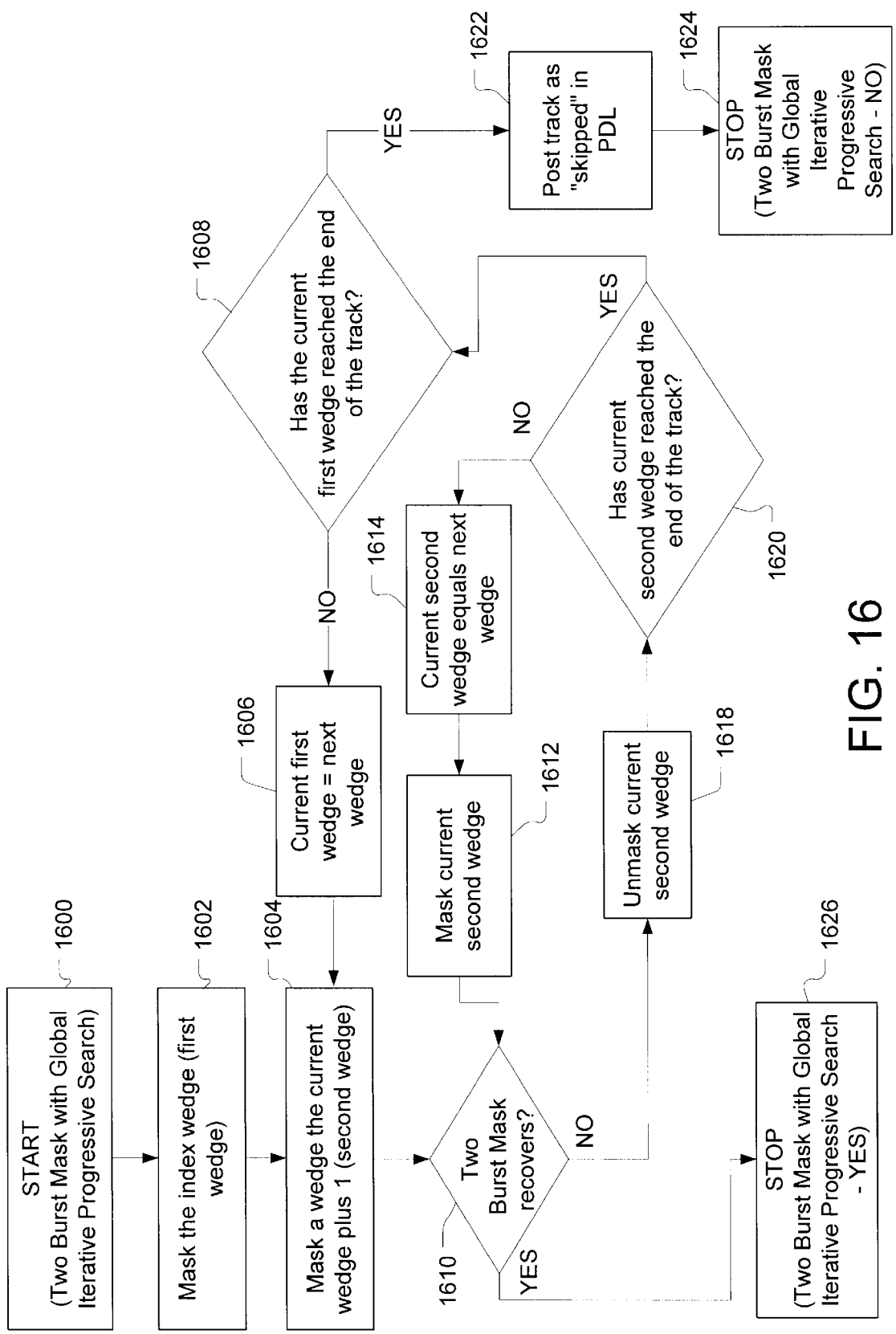
FIG. 16 depicts a flowchart of steps for a two burst mask with global iterative progressive search in an exemplary embodiment of the present invention.

FIG. 16 depicts a flowchart of steps for a two burst mask with global iterative progressive search (step 714 of FIG. 7) in an exemplary embodiment of the present invention. The masking step starts in step 1600. Step 1602 masks a "first wedge" at the index wedge on the track. The index wedge marks the nominal start of the track. Step 1604 masks a "second wedge" at the first wedge plus one (i.e., the next wedge after the current first wedge. Step 1610 retests the track using the two burst mask with the first and second wedges broadly masked. If no additional errors are detected in step 1610 (i.e., the two burst mask recovers the track), the masking step stops in step 1626 with a YES result.

If step 1610 detects errors, step 1618 unmasks the current second wedge. Step 1620 determines whether the second wedge has reached the end of the track (i.e., wrapped around to the index wedge). If not, the current second wedge is indexed to the next wedge in the track in step 1624 and the new second wedge is masked in step 1612. If the second wedge has reached the end of the track and the first wedge has reached the end of the track, as determined in step 1608, step 1622 posts the track as "skipped" to the PDL, and the masking step stops with a NO result in step 1624. If the first wedge has not reached the end of the track, step 1606 unmasks the first wedge and indexes the first wedge to the next wedge in the track. Step 1606 also masks the new first wedge. Step 1604 sets and masks the second wedge at the current first wedge plus one. The iterative processing continues until all pairs of servo wedges on the track have been masked.

In summary, an embodiment disclosed herein is directed to a method for identifying a defective servo information element in a track (such as 146) on a disc (such as 142) to prevent processing of erroneous servo information by a servo system (such as that included in servo loop 150) of a disc drive system (such as 110) during normal operation. Servo information elements (such as servo wedge 190) are read from the track (such as 146) on the disc (such as 142). First servo data status values associated with the servo information elements (such as 190) are received (such as in 402). If the first servo data status value associated with a first servo information element (such as 190) fails to satisfy a first predetermined criterion, the first servo information element is identified as a suspected servo information element (such as in 422). Location and error type information associated with the suspected servo information element are recorded (such as in 424). A second servo information element is masked (such as in 904) and the servo information elements (such as 190) from the track (such as 146) on the disc (such as 142) are reread. Second servo data status values for the servo information elements (such as 190) are received. If the second servo data status value associated with the suspected servo information element satisfies the first predetermined criterion, the second servo information element is identified as the defective servo information element (such as in 716).

In another embodiment of the present invention, servo information elements (such as 190) from the track (such as 146) on the disc (such as 142) are also read (such as in 302) to received third servo data status values for the servo information elements (such as 190). A second predetermined criterion that is more restrictive than the first predetermined criterion is also received. If the third servo data status value associated with the first servo information element fails to satisfy the second predetermined criterion, the first servo information element is identified as the suspected servo information element (such as in 318).

In an embodiment of the present invention, the first servo status values includes gray code error status values. The first servo information element is identified as the suspected servo information element, if the gray code error status value associated with the first servo information element indicates a gray code error (such as in 406). Another embodiment of the present invention includes first servo status values comprising PWM status values. In this embodiment, the first servo information element is identified as the suspected servo information element, if the PWM status value associated with the first servo information element exceeds a predetermined PWM threshold (such as in 424). In yet another embodiment of the present invention, the first servo status values includes erase field error status values. In this embodiment, the servo information elements (such as 190) in the track (such as 146) is identified as defective, if the erase field error status value associated with the first servo information element indicates an erase field error (such as in 410). Furthermore, in another embodiment of the present invention, the first servo status values includes position error signal values. In this embodiment, the servo information element is identified as the suspected servo information element, if the position error signal value associated with the first servo information element exceeds a predetermined position error signal limit (such as in 418). Alternatively or additionally, the servo information elements are identified as defective, if a sum of the position error signal values within the span designated relative to the first servo information element exceeds a predetermined position error signal sum limit (such as in 518).

In another embodiment of the present invention, a span of the servo information elements are designated relative to the suspected servo information element (such as in 1102). Each individual servo information element within the span is iteratively masked (such as in 1106), while the servo information elements in the track are reread for each iteration until the second servo data status values for the servo information elements satisfy the first predetermined criterion (such as in 716).

In another embodiment of the present invention, the suspected servo information element is masked (such as 1302). A span of the servo information elements is designated relative to the suspected servo information element (such as in 1306). Each individual servo information element within the span is iteratively masked (such as in 1312), while the servo information elements in the track are reread for each iteration until the second servo data status values for the servo information elements satisfy the first predetermined criterion (such as in 716).

In another embodiment of the present invention, a plurality of the servo information elements are iteratively masked (such as in 1406 and 1414), while the servo information elements in the track are reread for each iteration until the second servo data status values for the servo information elements satisfy the first predetermined criterion (such as in 716).

In another embodiment of the present invention, a first error zone in a hit table (such as 176) is designated (such as in 804), having a first predetermined span length and including a first suspected servo information element. A second error zone in the hit table (such as 176) is also designated (such as in 810), having a second predetermined span length and including a second suspected servo information element located outside the first error zone. If the second error zone overlaps the first suspected servo information element, the first error zone is ignored (such as in 814). In yet another embodiment of the present invention, only a defective portion of the defective servo information element is masked (such as in 908), including one of a gray code portion or a servo burst portion. In another embodiment of the present invention, it is determined whether the track is oscillatory (such as in 516), and if so, the track is masked (such as in 518).

In an embodiment of the present invention, a disc drive system identifies a defective servo information element in a track (such as 146) on a disc (such as 142) to prevent processing of erroneous servo information by a servo system (such as that included in servo loop 150) of a disc drive system (such as 110) during normal operation. A read head (such as 132) reads servo information elements (such as 190) from the track on the disc. A test module (such as 208) identifies a first servo information element (such as 190) as a suspected servo information element, if a first servo data status value associated with the first servo information element fails to satisfy a predetermined criterion. A storage module (such as 164) stores in a hit table (such as 176) location and error type information associated with the suspected servo information element. A recovery module (such as 214) masks a second servo information element, rereads the servo information elements (such as 190) to receive second servo data status values for the servo information elements, and if the second servo data status value associated with the suspected servo information element satisfies the predetermined criterion, identifies the second servo information element as the defective servo information element (such as in 716). In another embodiment of the present invention, the recovery module also masks a third servo information element.

In another embodiment of the present invention, a partial defect masking module (such as 908) partially masks the second servo information element, such that the second servo data status values received for the servo information elements in the track satisfy the predetermined criterion. In yet another embodiment of the present invention, an iterative search module (such as 712) performs an iterative search for the second servo information element.

In an embodiment of the present invention, a defect log (such as 172) includes location information and error type information associated with the second servo information element. The error type information designates at least a partial portion of the second servo information element to be ignored by a servo processor.

In another embodiment of the present invention, the error type information includes one of a gray code error and a position error signal error. In another embodiment of the present invention, a disc drive system (such as 110) for identifying a defective servo information element in a track on a disc prevents processing of erroneous servo information by a servo system of the disc drive system during normal operation. A read head (such as 132) reads servo information elements associated with servo data status values from the disc. A device (such as 150) for identifying the defective servo information element (such as 190) in accordance with the servo data status values.

While the method disclosed herein has been described and shown with reference to particular steps performed in a particular order, it will be understood that these steps may be combined, sub-divided, or re-ordered to form an equivalent method without departing from the teachings of the present invention. Accordingly, unless specifically indicated otherwise, the order and grouping of steps are not limitations of the present invention.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims. For example, multiple burst masks exceeding two burst masks and multiple error zone searches exceeding two error zones are contemplated within the scope of the present invention.

What is claimed is:

1. A method for identifying a defective servo information element in a track on a disc to prevent processing of erroneous servo information by a servo system of a disc drive system during normal operation, the method comprising the steps of:

(a) reading servo information elements from the track on the disc to receive first servo data status values associated with the servo information elements;

(b) if the first servo data status value associated with a first servo information element fails to satisfy a first predetermined criterion, identifying the first servo information element as a suspected servo information element;

(c) recording location and error type information associated with the suspected servo information element;

(d) masking a second servo information element;

(e) rereading the servo information elements from the track on the disc to receive second servo data status values for the servo information elements; and (f) if the second servo data status value associated with the suspected servo information element satisfies the first predetermined criterion, identifying the second servo information element as the defective servo information element.

2. The method of claim 1 further comprising the steps of:

(g) reading the servo information elements from the track on the disc to receive third servo data status values for the servo information elements;

(h) receiving a second predetermined criterion that is more restrictive than the first predetermined criterion, and (i) if the third servo data status value associated with the first servo information element fails to satisfy the second predetermined criterion, identifying the first servo information element as the suspected servo information element.

3. The method of claim 1 wherein reading step (a) comprises the step of receiving gray code error status values in the first servo data status values, and identifying step (b) comprises the step of identifying the first servo information element as the suspected servo information element, if the gray code error status value associated with the first servo information element indicates a gray code error.

4. The method of claim 1 wherein reading step (a) comprises the step of receiving PWM status values in the first servo data status values; and identifying step (b) comprises the step of identifying the first servo information element as the suspected servo information element, if the PWM status value associated with the first servo information element exceeds a predetermined PWM threshold.

5. The method of claim 1 wherein reading step (a) comprises the step of receiving erase field error status values in the first servo data status values; and identifying step (b) comprises the step of identifying the servo information elements in the track as defective, if the erase field error status value associated with the first servo information element indicates an erase field error.

6. The method of claim 1 wherein reading step (a) comprises the step of receiving position error signal values in the first servo data status values; and identifying step (b) comprises the step of identifying the first servo information element as the suspected servo information element, if the position error signal value associated with the first servo information element exceeds a predetermined position error signal limit.

7. The method of claim 1 wherein reading step (a) comprises the step of receiving position error signal values in the first servo data status values; and identifying step (b) comprises the steps of:
(b.1) designating a span of the servo information element relative to the first servo information element, and
(b.2) the servo information elements in the track as defective, if a sum of the position error signal values within the span exceeds a predetermined position error signal sum limit.

8. The method of claim 1 wherein masking step (d) comprises the steps of:
(d.1) designating a span of the servo information elements relative to the suspected servo information element, and
(d.2) iteratively masking each individual servo information element within the span;
and rereading step (e) comprises the step of rereading the servo information elements for each iteration of masking step (d.2) until the second servo data status values for the servo information elements satisfy the first predetermined criterion.

9. The method of claim 1 wherein masking step (d) comprises the steps of:
(d.1) masking the suspected servo information element,
(d.2) designating a span of the servo information elements relative to the suspected servo information element, and
(d.3) iteratively masking each servo information element within the span;
and rereading step (e) comprises the step of rereading the servo information elements for each iteration of masking step (d.3) until the second servo data status values for the servo information elements satisfy the first predetermined criterion.

10. The method of claim 1 wherein masking step (d) comprises the step of iteratively masking a plurality of the servo information elements; and rereading step (e) comprises the step of rereading the servo information elements for each iteration of masking step (d) until the second servo data status values for the servo information elements in the track satisfy the first predetermined criterion.

11. The method of claim 1 wherein recording step (c) comprises the steps of:
(c.1) designating a first error zone in a hit table having a first predetermined span length and including a first suspected servo information element;

(c.2) designating a second error zone in the hit table having a second predetermined span length and including a second suspected servo information element located outside the first error zone, responsive to the designating step (c.1); and
(c.3) ignoring the first error zone, if the second error zone overlaps the first suspected servo information element.

12. The method of claim 1 wherein masking step (d) comprises the step of masking only one of a gray code portion and a servo burst portion of the defective servo information element.

13. The method of claim 1 further comprising
(g) determining whether the track is oscillatory; and
(h) masking the track, if the track is determined to be oscillatory.

14. A disc drive system for identifying a defective servo information element in a track on a disc to prevent processing of erroneous servo information by a servo system of the disc drive system during normal operation, the system comprising:
a read head that reads servo information elements from the track on the disc;
a test module that identifies a first servo information element as a suspected servo information element, if a first servo data status value associated with the first servo information element fails to satisfy a predetermined criterion;
a storage module that stores location and error type information associated with the suspected servo information element; and
a recovery module that masks a second servo information element, rereads the servo information elements to receive second servo data status values for the servo information elements, and if the second servo data status value associated with the suspected servo information element satisfies the predetermined criterion, identifies the second servo information element as the defective servo information element.

15. The disc drive system of claim 14 wherein the recovery module masks the second servo information element and a third servo information element.

16. The disc drive system of claim 14 wherein the recovery module comprises:
a partial defect masking module that partially masks the second servo information element, such that the second servo data status values received for the servo information elements in the track satisfy the predetermined criterion.

17. The disc drive system of claim 14 wherein the recovery module comprises:
an iterative search module that performs an iterative search for the second servo information element.

18. The disc drive system of claim 14 further comprising:
a defect log including location information and error type information associated with the second servo information element, the error type information designating at least a partial portion of the second servo information element to be ignored by a servo processor.

19. The disc drive system of claim 14 wherein the error type information includes one of a gray code error and a position error signal error.

* * * * *

UNITED STATES PATENT AND TRADEMARK OFFICE
CERTIFICATE OF CORRECTION

PATENT NO. : 6,392,831 B1
DATED : May 21, 2002
INVENTOR(S) : Ricky Wei Watt Yeo et al.

It is certified that error appears in the above-identified patent and that said Letters Patent is hereby corrected as shown below:

Column 2,
Line 17, "modem" should be -- modern --.

Column 3,
Line 12, "...element In a track..." should be -- ...element in a track.... --
Line 15, "...element falls to satisfy..." should be -- ...element fails to satisfy... --
Line 32, "formation" should be -- information --

Column 8,
Line 1, "...Zone Scarch step 212..." should be -- ...Zone Search step 212... --
Line 28, "...Gray Codc Error..." should be -- ...Gray Code Error... --

Column 11,
Line 13, "...search 714 arc..." should be -- ...search 714 are... --

Column 16,
Line 62, "...a plurality of the servo information elements arc iteratively..."
should be -- ...a plurality of the servo information elements is iteratively... --

Column 17,
Line 18, "...information clement in..." should be -- information element in... --

Signed and Sealed this

Fourth Day of March, 2003

JAMES E. ROGAN
*Director of the United States Patent and Trademark Office*